United States Patent
Kayama

(10) Patent No.: US 11,764,586 B2
(45) Date of Patent: Sep. 19, 2023

(54) USB DRP CONTROLLER, CONTROL METHOD, AND CONTROL PROGRAM

(71) Applicant: RENESAS ELECTRONICS CORPORATION, Tokyo (JP)

(72) Inventor: Norio Kayama, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 1077 days.

(21) Appl. No.: 16/408,148

(22) Filed: May 9, 2019

(65) Prior Publication Data

US 2019/0372375 A1    Dec. 5, 2019

(30) Foreign Application Priority Data

Jun. 4, 2018    (JP) ................................ 2018-106623

(51) Int. Cl.
  *H02J 7/00*    (2006.01)
  *H02J 7/34*    (2006.01)

(52) U.S. Cl.
  CPC ............ *H02J 7/00* (2013.01); *H02J 7/00034* (2020.01); *H02J 7/007182* (2020.01); *H02J 7/342* (2020.01); *H02J 2207/30* (2020.01)

(58) Field of Classification Search
  CPC ... H02J 7/00034; H02J 7/007182; H02J 7/342
  USPC ........................................................ 320/107
  See application file for complete search history.

(56) References Cited

U.S. PATENT DOCUMENTS

| | | | | |
|---|---|---|---|---|
| 5,826,958 A | * | 10/1998 | Avitan | ................. H02J 7/0031 320/DIG. 19 |
| 7,703,046 B2 | * | 4/2010 | Fallon | ....................... G06F 1/28 715/764 |
| 7,725,094 B2 | * | 5/2010 | Chary | ............... H04W 52/0277 455/574 |

(Continued)

FOREIGN PATENT DOCUMENTS

JP         2017-138870 A        8/2017

OTHER PUBLICATIONS

"Shocker! Test Shows Physical Buttons Are Less Time-Consuming in Cars Than Touchscreens," Sebastian Blanco, CarAndDriver.com, Published Aug. 21, 2022, Accessed Online May 1, 2023, https://www.caranddriver.com/news/a40949962/car-buttons-easier-than-touchscreens-study/ (Year: 2022).*

*Primary Examiner* — John T Trischler
(74) *Attorney, Agent, or Firm* — McDermott Will & Emery LLP

(57) ABSTRACT

Controllers are provided for providing ports corresponding to Dual Role Powers (DRPs), which may be both the feed side and the receive side, in accordance with the USB Type-C and/or USB Power Delivery standards. The controller includes a control interface for controlling a power management unit for controlling charging and discharging of the secondary battery, a signal transmission module for exchanging a signal with a connection destination via a communication line in the USB cable, and a sequence execution unit. If the power supply from the secondary battery becomes over discharged while the power stored in the secondary battery as the power supply side is being supplied to the connection destination, the sequence execution unit stops the substantial execution of the sequence as the power receiving side unless a predetermined condition is satisfied.

9 Claims, 14 Drawing Sheets

(56) References Cited

U.S. PATENT DOCUMENTS

| | | | |
|---|---|---|---|
| 8,335,940 B2* | 12/2012 | Umezu | G06F 11/3058 713/340 |
| 9,153,984 B2* | 10/2015 | Ono | H02J 7/00038 |
| 9,558,144 B2* | 1/2017 | Nge | G06F 13/4068 |
| 9,665,150 B2* | 5/2017 | Sakashita | G06F 1/3284 |
| 9,715,263 B2* | 7/2017 | Nagase | H04L 25/4906 |
| 9,880,611 B2* | 1/2018 | Zha | G06F 1/3287 |
| 9,916,272 B2* | 3/2018 | Nge | G06F 13/382 |
| 10,044,202 B2* | 8/2018 | Coq | H02J 7/00302 |
| 10,063,073 B2* | 8/2018 | Yao | H02J 7/00308 |
| 10,204,068 B2* | 2/2019 | Nge | G06F 13/382 |
| 10,230,235 B2* | 3/2019 | Endo | H02H 5/047 |
| 10,261,557 B2* | 4/2019 | Kim | G06F 1/3296 |
| 10,275,389 B2* | 4/2019 | Chen | G06F 13/385 |
| 10,289,589 B2* | 5/2019 | Chhor | G06F 13/4022 |
| 10,310,576 B2* | 6/2019 | Ueki | G06F 21/44 |
| 10,348,112 B2* | 7/2019 | Somerville | H02M 3/1582 |
| 10,437,752 B2* | 10/2019 | Xu | G06F 13/4282 |
| 10,452,102 B2* | 10/2019 | Sultenfuss | H01M 10/425 |
| 10,516,279 B2* | 12/2019 | Kobayashi | H02J 7/00 |
| 10,545,550 B2* | 1/2020 | Chen | G06F 1/266 |
| 10,579,119 B2* | 3/2020 | Lambert | G06F 13/4282 |
| 10,599,597 B2* | 3/2020 | Mattos | G06F 13/4081 |
| 10,635,151 B2* | 4/2020 | Kim | G06F 1/10 |
| 10,664,434 B2* | 5/2020 | Chen | G06F 13/4282 |
| 10,804,713 B2* | 10/2020 | Shen | H02J 7/342 |
| 10,804,800 B2* | 10/2020 | Muto | G06F 1/4068 |
| 10,860,074 B2* | 12/2020 | Kuroi | G06F 1/305 |
| 10,901,474 B2* | 1/2021 | Uchida | G06F 1/266 |
| 11,016,853 B2* | 5/2021 | Kim | G06F 16/489 |
| 11,043,822 B2* | 6/2021 | Lau | H01M 10/425 |
| 11,146,074 B2* | 10/2021 | Kinoshita | H02J 7/0063 |
| 11,225,167 B2* | 1/2022 | Irwin | B62K 5/007 |
| 11,249,448 B2* | 2/2022 | Yamaya | H02J 7/00 |
| 11,258,286 B2* | 2/2022 | Takei | G06F 1/3296 |
| 11,281,271 B2* | 3/2022 | Aoki | H02J 7/02 |
| 11,307,630 B2* | 4/2022 | Takei | G06F 1/28 |
| 2003/0132949 A1* | 7/2003 | Fallon | G06F 1/28 715/700 |
| 2007/0004467 A1* | 1/2007 | Chary | H04W 52/0277 455/572 |
| 2013/0154551 A1* | 6/2013 | Jeansonne | G06F 1/266 320/137 |
| 2013/0241469 A1* | 9/2013 | Ono | G01R 31/385 320/107 |
| 2015/0311729 A1* | 10/2015 | Ono | H02J 7/0042 320/106 |
| 2015/0340890 A1* | 11/2015 | Yao | H02J 7/00308 320/114 |
| 2016/0092393 A1* | 3/2016 | Nge | G06F 13/4068 710/14 |
| 2016/0204628 A1* | 7/2016 | Huang | G06F 1/26 713/300 |
| 2016/0216757 A1* | 7/2016 | Kim | G06F 1/3212 |
| 2016/0254902 A1* | 9/2016 | Nagase | G06F 1/266 375/333 |
| 2017/0038810 A1* | 2/2017 | Ueki | G06F 1/266 |
| 2017/0060225 A1* | 3/2017 | Zha | G06F 1/3234 |
| 2017/0085080 A1* | 3/2017 | Huang | H02M 3/1582 |
| 2017/0139864 A1* | 5/2017 | Nge | G06F 13/4282 |
| 2017/0220090 A1* | 8/2017 | Kim | G06F 1/266 |
| 2017/0222435 A1* | 8/2017 | Endo | H02J 7/00 |
| 2017/0229892 A1* | 8/2017 | Kobayashi | H01R 24/60 |
| 2017/0271892 A1* | 9/2017 | Cross | H02J 7/342 |
| 2017/0351638 A1* | 12/2017 | Chen | G06F 13/4282 |
| 2018/0004277 A1* | 1/2018 | Matsui | G06F 1/3287 |
| 2018/0004696 A1* | 1/2018 | Lee | G06F 13/4282 |
| 2018/0059750 A1* | 3/2018 | Kaechi | H02J 7/342 |
| 2018/0060175 A1* | 3/2018 | Kim | G06F 11/1417 |
| 2018/0060261 A1* | 3/2018 | Chhor | G06F 13/4282 |
| 2018/0062218 A1* | 3/2018 | Kaechi | H02J 7/0031 |
| 2018/0074564 A1* | 3/2018 | Paparrizos | G06F 1/266 |
| 2018/0081326 A1* | 3/2018 | Degura | G05B 11/01 |
| 2018/0131203 A1* | 5/2018 | Coq | G01R 31/44 |
| 2018/0131206 A1* | 5/2018 | Coq | G01R 31/371 |
| 2018/0166886 A1* | 6/2018 | Ueta | H02J 7/00036 |
| 2018/0181177 A1* | 6/2018 | Fukute | G06F 1/266 |
| 2018/0181515 A1* | 6/2018 | Nge | G06F 13/4068 |
| 2018/0183248 A1* | 6/2018 | Shen | H02J 7/00 |
| 2018/0254648 A1* | 9/2018 | Harju | H02J 7/007182 |
| 2018/0275732 A1* | 9/2018 | Chen | G06F 1/266 |
| 2018/0287491 A1* | 10/2018 | Muto | H02J 7/0013 |
| 2018/0341310 A1* | 11/2018 | Lambert | G06F 13/4282 |
| 2018/0351380 A1* | 12/2018 | Kaechi | H02J 7/342 |
| 2018/0373289 A1* | 12/2018 | Sultenfuss | H02J 7/0031 |
| 2019/0036365 A1* | 1/2019 | Regupathy | H02J 7/00032 |
| 2019/0129872 A1* | 5/2019 | Xu | G06F 13/4068 |
| 2019/0131810 A1* | 5/2019 | Lim | H02J 7/342 |
| 2019/0138072 A1* | 5/2019 | Kuroi | G06F 1/28 |
| 2019/0157863 A1* | 5/2019 | Endo | H02H 3/202 |
| 2019/0197009 A1* | 6/2019 | Chen | G06F 13/385 |
| 2019/0220075 A1* | 7/2019 | Kim | G06F 1/3296 |
| 2019/0237976 A1* | 8/2019 | Lau | H02J 7/02 |
| 2019/0278731 A1* | 9/2019 | Mattos | G06F 1/26 |
| 2019/0286202 A1* | 9/2019 | Uchida | H02J 7/02 |
| 2019/0288519 A1* | 9/2019 | Takei | H02J 7/0063 |
| 2019/0312448 A1* | 10/2019 | Lim | G05F 3/02 |
| 2020/0067332 A1* | 2/2020 | Kinoshita | G06F 13/382 |
| 2020/0073349 A1* | 3/2020 | Yamaya | H02J 7/0045 |
| 2020/0112068 A1* | 4/2020 | Shimma | H02J 7/0068 |
| 2020/0156501 A1* | 5/2020 | Irwin | B60L 58/14 |
| 2020/0174538 A1* | 6/2020 | Aoki | G06F 13/4282 |
| 2020/0233822 A1* | 7/2020 | Zheng | G06F 3/1407 |
| 2020/0409888 A1* | 12/2020 | Lee | G06F 13/4022 |
| 2021/0123985 A1* | 4/2021 | Suzuki | G06F 13/4282 |
| 2021/0203168 A1* | 7/2021 | Sharma | G06F 1/28 |
| 2021/0397241 A1* | 12/2021 | Takei | G06F 1/266 |
| 2022/0035436 A1* | 2/2022 | Waters | G06F 13/385 |

* cited by examiner

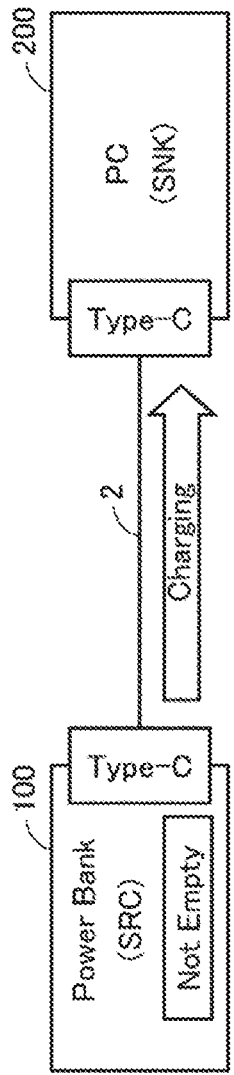
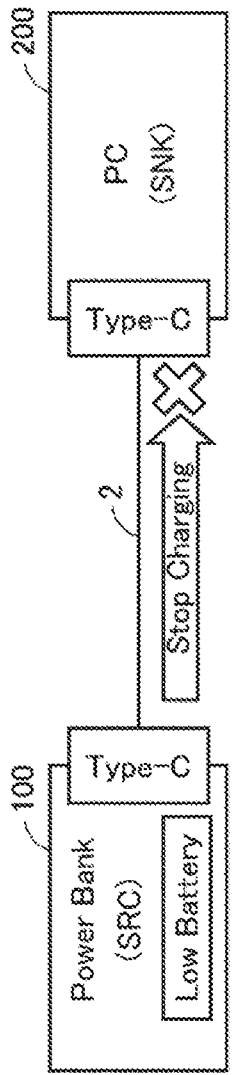
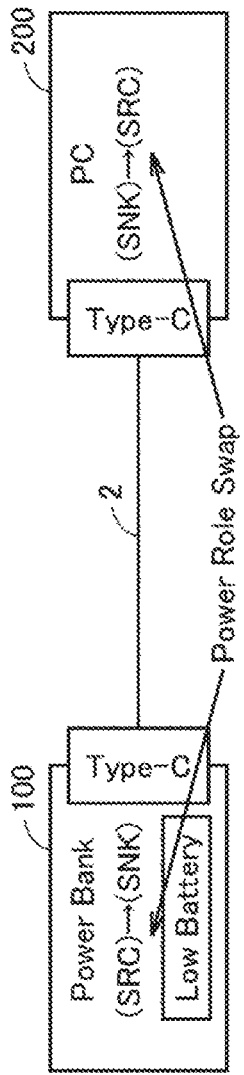
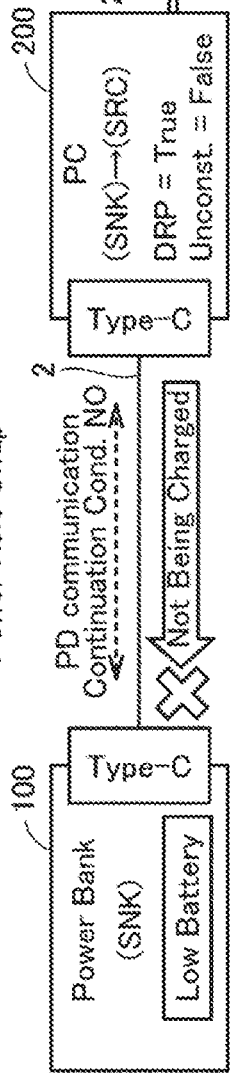
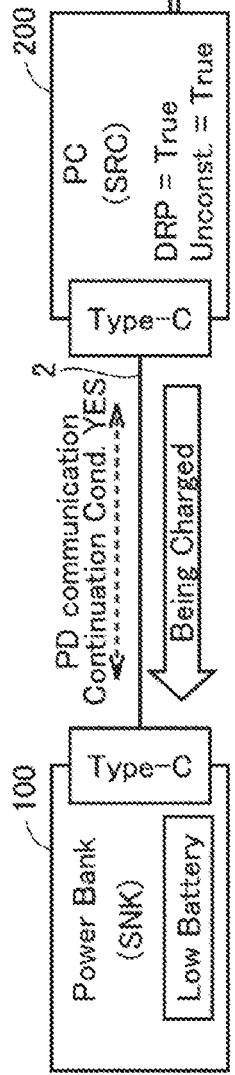

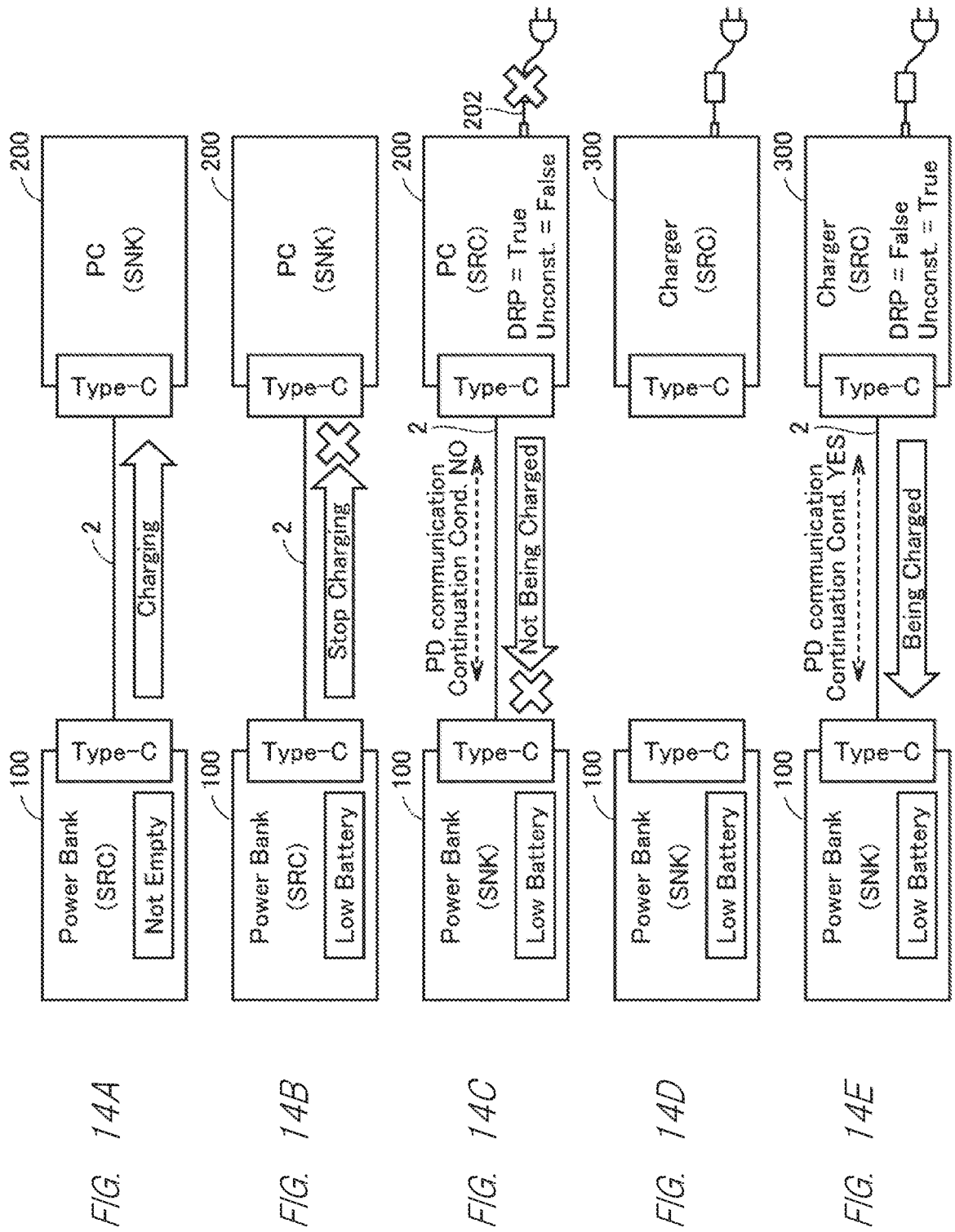

USB DRP CONTROLLER, CONTROL METHOD, AND CONTROL PROGRAM

CROSS-REFERENCE TO RELATED APPLICATIONS

The disclosure of Japanese Patent Application No. 2018-106623 filed on Jun. 4, 2018 including the specification, drawings and abstract is incorporated herein by reference in its entirety.

BACKGROUND

The present disclosure relates to controllers, for example, the present disclosure is used to execute sequences in accordance with the Universal Serial Bus standard to execute a power receiving operation with respect to a destination.

Along with the spread of mobile devices, mobile batteries for supplying electric power to mobile devices, and the like have become widespread (for example, see Japanese unexamined Patent Application publications No. 2017-138870, and the like). In the following explanation, a power storage device that stores electric power supplied from an external power source and supplies stored electric power to the external device is referred to as a "PowerBank".

In a PowerBank commonly used at present, an output (power supply) port for supplying electric power to external devices and an input (power reception) port for receiving electric power from an external power source are provided separately from each other. For example, a USB Standard-A type interface is used for the power supply port, and a USB Micro-B type interface is used for the power reception port. Since the power supply port and the power reception port are independently provided for each function in this manner, for example, even if the cable is kept connected after the PowerBank is charged, the stored electric power does not flow backward.

As a newer USB standard, a USB Type-C interface is becoming popular. According to the USB Type-C interface, ports having the same shapes are used for power supply and power reception. Therefore, a single port supports both power supply and power reception.

In the USB Type-C standard, a device supplying electric power is referred to as "Source" or "SRC", and a device receiving electric power is referred to as "Sink" or "SNK". Furthermore, a device corresponding to both power supply and power reception is referred to as "DRP: Dual Role Power". Implementing the DRP function reduces the cost and space by requiring only one port, which conventionally required two ports separately.

With these advantages, when USB Type-C interfaces are employed in mobile devices such as PowerBank, smart phones, tablets, personal computers, etc., it is expected that the DRP function will be implemented so that the DRP function can support both power supply and power reception at one port.

Further, in the USB Type-C standard, USB Power Delivery (hereinafter, simply referred to as "PD"), which is a power supply standard for realizing the exchange of electric power using a USB cable, can be used. According to the USB PD, it is possible to exchange larger voltages and currents and therefore, it is possible to realize a shorter time of charge. In addition to the USB Type-C interface, it is assumed that the USB PD function is also popularized.

SUMMARY

It is assumed that only a single port of the USB Type-C interface as described above is provided, and power is supplied to external devices using a PowerBank in which a DRP function is implemented. The inventor of the present application has found that in such a configuration, a new problem that does not occur when power is supplied by using a PowerBank in which the power supply port and the charge port are separately provided occurs.

Other objects and novel features will become apparent from the description of this specification and the accompanying drawings.

In accordance with an embodiment, a controller is provided for providing a port corresponding to DRP (Dual Role Power), which may be both the power supply side and the power reception side, in accordance with the Universal Serial Bus Type-C and/or USB Power Delivery standard. The controller includes a control interface for controlling a power management unit for controlling charging and discharging of the secondary battery, a signal transmission module for exchanging signals with a connection destination via a communication line in the USB cable, and a sequence execution unit coupled to the control interface and the signal transmission module. If the power supply from the secondary battery becomes impossible while the electric power stored in the secondary battery as the power supply side is being supplied to the connection destination, the sequence execution unit stops the substantial execution of the sequence as the power receiving side unless a predetermined condition is satisfied.

According to an embodiment, an unintended action for the user of the PowerBank implementing the DRP function can be avoided.

BRIEF DESCRIPTION OF THE DRAWINGS

FIG. 13A thru FIG. 13E are schematic views illustrating an operation example of a PowerBank according to the fourth embodiment.

FIG. 14A thru FIG. 14E are schematic diagrams illustrating another operation of a PowerBank according to the fourth embodiment.

DETAILED DESCRIPTION

Figure 1:
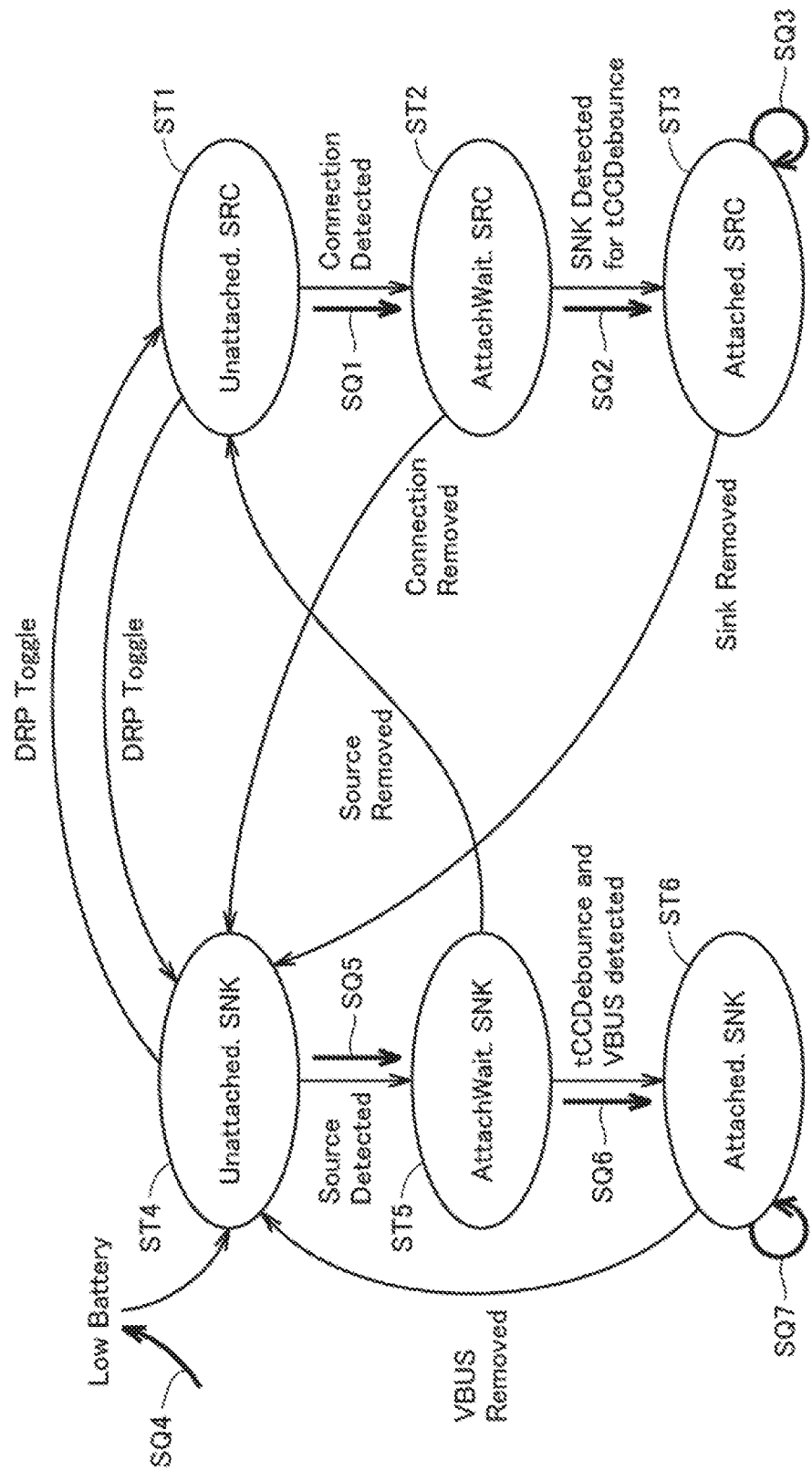
FIG. 1 is a diagram depicting the key parts of the state transitions of device responsible for the Port Role of DRP in accordance with the USB Type-C standard.

Several embodiments are described in detail with reference to the drawings. The same or corresponding portions in the drawings are denoted by the same reference numerals, and descriptions thereof are not repeated.

A configuration in which only a single port of a USB Type-C interface is provided and electric power is supplied to external devices using a PowerBank in which a DRP function is implemented is described. At this time, it is assumed that the USB Type-C interface and the DRP function are also implemented in the external devices connected to the PowerBank.

Procedures for supplying electric power in accordance with the USB Type-C standard and the USB PD standard is described. As described above, the USB Type-C standard defines three states: Source (SRC), Sink (SNK), and DRP. These states are also referred to as Port Role. In the following, a device in charge of Port Role of DRP is mainly described.

FIG. 1 is a diagram showing the main part of state transitions of a device in charge of Port Role of DRP according to the USB Type-C standard. Referring to FIG. 1, the device in the Port Role of DRP is any of Unattached.SRC state (ST1), AttachWait.SRC state (ST2), Attached.SRC state (ST3), Unattached.SNK state (ST4), AttachWait.SNK state (ST5), and Attached.SNK state (ST6).

FIG. 2 is a diagram for explaining an operation when electric power is supplied from a PowerBank 100 having a DRP function to an external device having a DRP function. In FIG. 2, a laptop personal computer 200 is assumed as an external device.

Figure 2A:
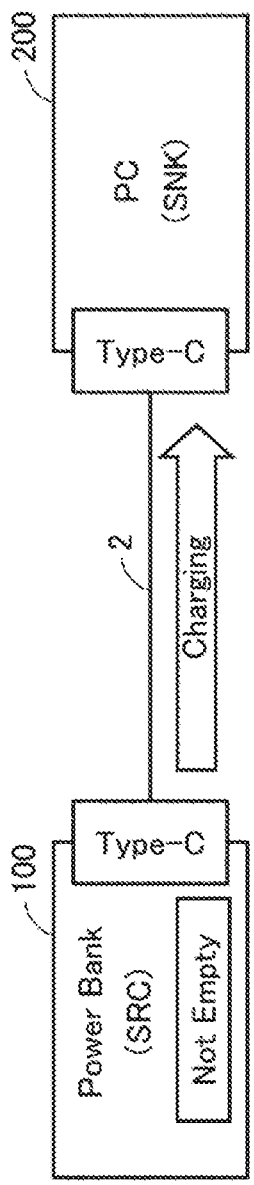
FIG. 2A thru FIG. 2D are diagrams for explaining the operation when electric power is supplied from a PowerBank equipped with a DRP function to an external device equipped with a DRP function.

Referring to FIG. 2A, first, the PowerBank 100 on the power supply side and the PC 200 on the power reception side are connected. Then, the Port Role of the PowerBank 100 is turned Source, and electric power starts supplying from the PowerBank 100 to the PC 200.

Referring again to FIG. 1, the state transition related to the start of such power supply is described. In the state prior to the connection of the USB cable 2, the PowerBank 100 repeats the state transition between the Unattached.SRC state (ST1) and the Unattached.SNK state (ST4). When the USB cable 2 is connected, the condition of "Connection Detected" is met and the Unattached.SRC state (ST1) to the AttachWait.SRC state (ST2) is transitioned (sequence SQ1). When a condition such as a supply voltage between the PowerBank 100 and the PC 200 is satisfied, the state transitions to the Attached.SRC state (ST3) (sequence SQ2). The Attached.SRC state (ST3) means a state in which a connection as a power supply device is recognized. In this condition, the power supply from the PowerBank 100 to the PC 200 starts (SQ3).

Figure 2B:
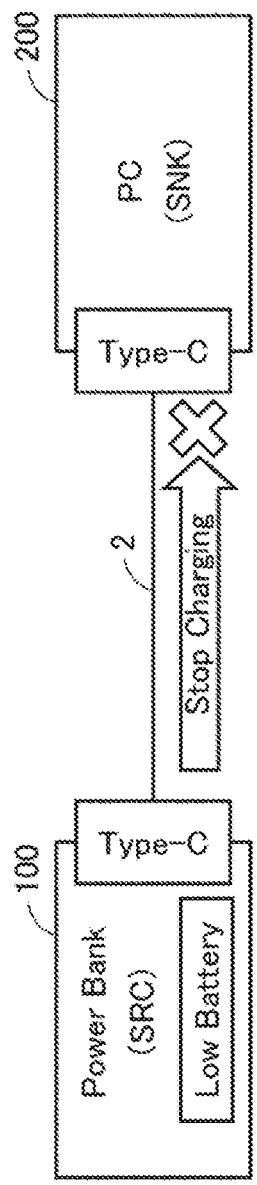

Thereafter, the supply of electric power from the PowerBank 100 to the PC 200 is continued, and finally, when the discharge voltage of the secondary battery in the PowerBank 100 drops to a predetermined value, the supply of electric power stops as shown in FIG. 2B. When the discharging voltage of the secondary battery drops until the power supply stops, the discharging voltage of the secondary battery drops to "Low Battery". Here, "Low Battery" is the same as "Dead Battery" defined in the USB standard in that the electric power stored in the battery is lowered and the electric power cannot be supplied to the external devices. However, in the "Low Battery" status, it is assumed that the power that can drive the controller of the own device remains. That is, in the "Low Battery" condition, various controls as described later can be performed.

The ports of the PowerBank 100, which is DRP capable of supplying and receiving electric power, changes to Sink, which means the device of the power receiving end, in the future, when the DRP turns Low Battery.

As shown in FIG. 1, in this state, the PowerBank 100 transitions from the Attached.SRC state (ST3) to the Unattached.SNK state (ST4) via the Low Battery state (sequence SQ4). The Unattached.SNK state (ST4) means a state in which the connection as the device of the power receiving side is recognized. In this condition, the PowerBank 100 attempts to reconnect with the destination.

Figure 2C:
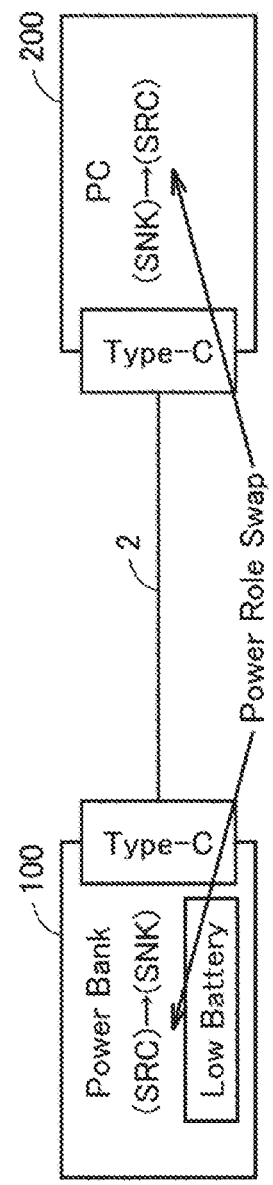

If the DRP function is also implemented in the PC 200, when the DRP function is connected to the PowerBank 100 of the Sink, the port of the PC 200 changes to a Source indicating a device on the power supply side. That is, as shown in FIG. 2C, the Port Role of the PowerBank 100 changes from Source to Sink, and the Port Role of the PC 200 changes from Sink to Source in accordance with the USB Type-C standard.

If the USB cable 2 between the PowerBank 100 and the PC 200 is left connected, the PowerBank 100 and the PC 200 are reconnected according to the USB Type-C standard.

That is, as shown in FIG. 1, the condition of "Source Detected" is satisfied, and the state transitions from the Unattached.SNK state (ST4) to the AttachWait.SNK state (ST5) (sequence SQ5). When the condition such as the supply voltage between the PowerBank 100 and the PC 200 is satisfied, the supply voltage shifts to the Attached.SNK state (ST6) (sequence SQ6). The Attached.SNK state (ST6) means a state in which the connection as the device of the power receiving side is recognized. In this condition, the power sequence from the PC 200 to the PowerBank 100 starts (SQ7).

Figure 2D:
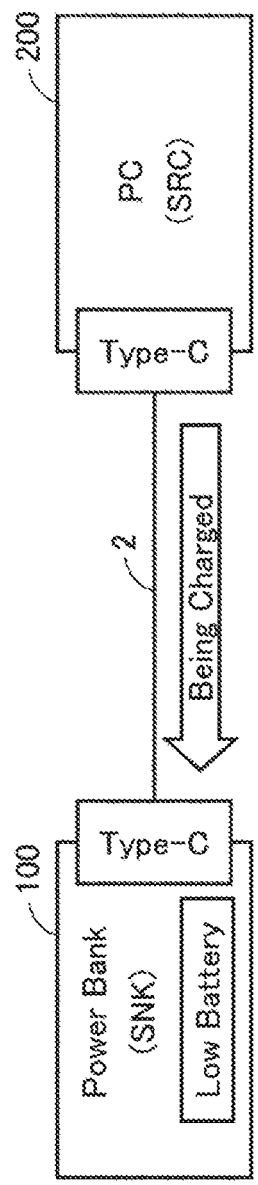

That is, as shown in FIG. 2D, the electric power supplied from the PowerBank 100 to the PC 200 is supplied from the PC 200 to the PowerBank 100.

Figure 3:
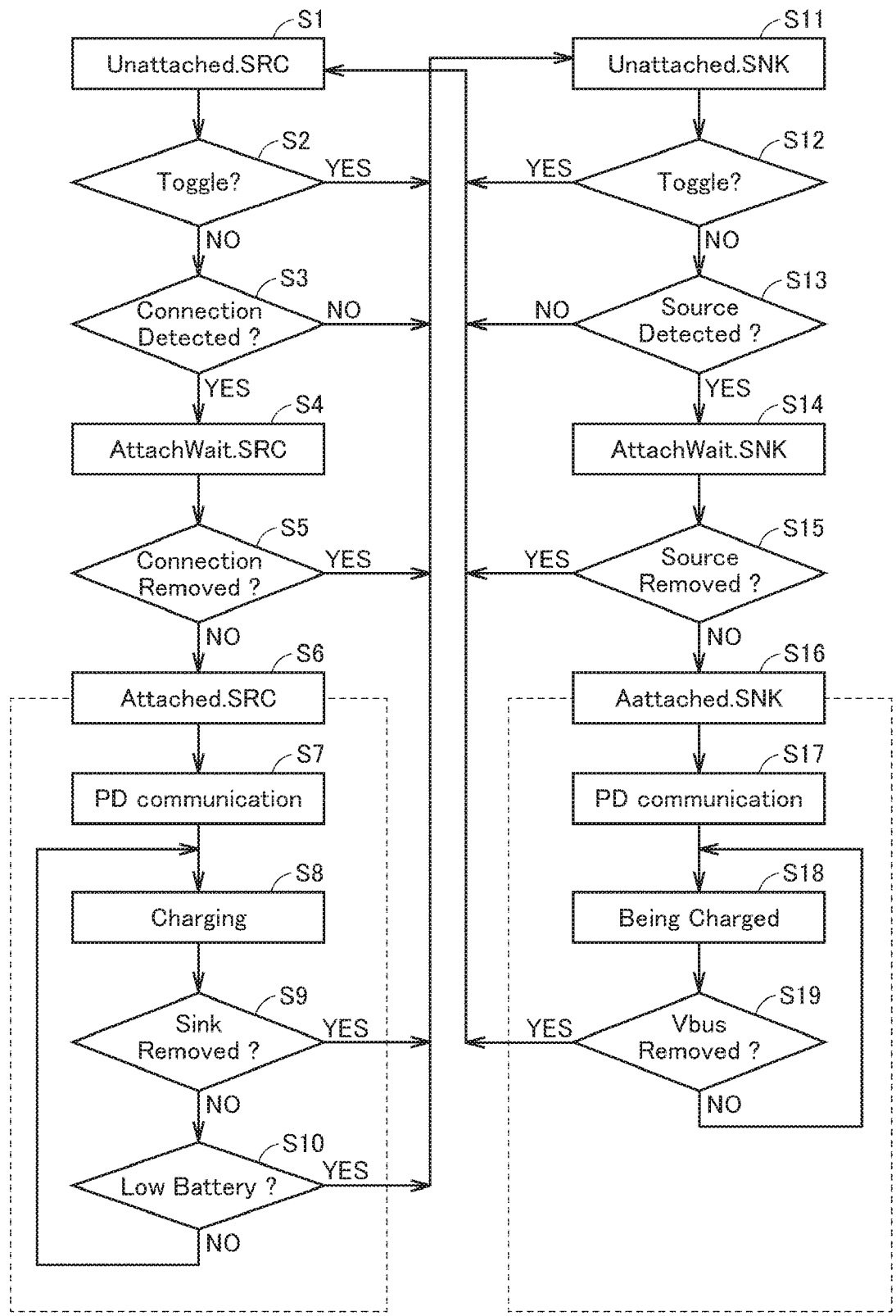
FIG. 3 is a flowchart illustrating a processing procedure pertaining to a state transition in FIG. 1.

FIG. 3 is a flowchart showing a processing procedure related to the state transition shown in FIG. 1. The steps shown in FIG. 3 are performed in each of the devices implementing the DRP function. For convenience of explanation, the description is made as processing executed by the PowerBank 100, but the same processing is also executed in the PC 200.

Referring to FIG. 3, the PowerBank 100 is initially a Unattached.SRC state (step S1). In operation S2, the PowerBank 100 determines whether the Toggle condition is satisfied. When the Toggle condition is satisfied (YES in step S2), the PowerBank 100 transitions to the Unattached.SNK state (step S11).

If the Toggle condition is not satisfied (NO in step S2), the PowerBank 100 determines whether the connection with the destination is detected (step S3) or not. If the connection with the destination is not detected (NO in step S3), the PowerBank 100 transitions to the Unattached.SNK state (step S11).

When the connection with the destination is detected (YES in step S3), the PowerBank 100 transitions to the AttachWait.SRC state (step S4). In operation S5, the PowerBank 100 determines whether the connection with the destination is disconnected.

When the connection with the destination is disconnected (YES in step S5), the PowerBank 100 transitions to the Unattached.SNK state (step S11).

If the connection with the destination is not disconnected (NO in step S5), the PowerBank 100 transitions to the Attached.SRC state (step S6). Subsequently, the PowerBank 100 executes communication (PD communication) in accordance with the USB PD standard (S7). In operation S8, electric power is supplied to the Sink device.

In operation S9, the PowerBank 100 determines whether the Sink device is disconnected. When the Sink device is disconnected (YES in step S9), the PowerBank 100 transitions to the Unattached.SNK state (step S11).

If the Sink device has not been disconnected (NO in step S9), the PowerBank 100 determines whether the discharging voltage of the secondary battery has dropped to a predetermined value and becomes Low Battery (step S10). When the Low Battery state is entered (YES in step S10), the PowerBank 100 transitions to the Unattached.SNK state (step S11).

If it is not Low Battery (NO in step S10), the process of step S8 and subsequent steps are repeated.

On the other hand, in the Unattached.SNK state shown in step S11, the PowerBank 100 determines whether the Toggle condition is satisfied in step S11. When the Toggle condition is satisfied (YES in step S12), the PowerBank 100 transitions to the Unattached.SRC state (step S1).

If the Toggle condition is not satisfied (NO in step S12), the PowerBank 100 determines whether a connection with the Source device has been detected (step S13). If the connection with the Source device is not detected (NO in step S13), the PowerBank 100 transitions to the Unattached.SRC state (step S1).

When the connection with the Source device is detected (YES in step S13), the PowerBank 100 transitions to the AttachWait.SNK state (step S14). In operation S15, the PowerBank 100 determines whether the Source device is disconnected from the own device 100.

When the connection with the Source device is disconnected (YES in step S15), the PowerBank 100 transitions to the Unattached.SRC state (step S1).

If the connection with the Source device is not disconnected (NO in step S15), the PowerBank 100 transitions to the Attached.SNK state (step S16). Subsequently, the PowerBank 100 executes communication (PD communication) in accordance with the USB PD standard (S17). The magnitude of the supplied voltage and current are determined by the PD communication executed in S17. In operation S18, the device starts receiving electric power from the Source device.

During power supply, the PowerBank 100 determines whether the Vbus, which is the power line in the USB cable 2, has been disconnected (step S19) or not. When the Vbus is disconnected (YES in step S19), the PowerBank 100 transitions to the Unattached.SRC state (step S1).

If the Vbus is not disconnected (NO in step S19), the processes in step S18 and subsequent steps are repeated.

In the communication (PD communication) according to the USB PD standard executed in steps S7 and S17 of FIG. 3, up to seven pieces of information (PDO: Power Data Object) on the Source side including information on the voltage and current that can be supplied on the Source side are presented to the Sink side. The Sink requests one of the presented PDOs. The Source side changes the output state of its own device in accordance with a request from the Sink side and the exchange of electric power between the Sink side and the Sink side starts. In this manner, the PD communication can optimize the magnitude of the voltage and current supplied, depending on the specifications between the devices in question, and the like.

As described above, when the Source device and the Sink device become "Attached.XX" state each other according to the USB PD standard, the PD communication is executed, so that the exchange of electric power starts after being adjusted between the two devices. Therefore, it is possible to avoid a situation in which the Source side does not supply electric power or the Sink side does not receive electric power.

As described above, when the PowerBank 100 and the external device are connected to each other via the USB Type-C interface, if both devices have the DRP function, the Source side and the Sink side alternately operate.

Originally, after the external device has been charged until secondary batteries in the PowerBank 100 becomes empty, the power receiving operation should stop there. However, the power is returned from the external device to the PowerBank 100 between the devices having the DRP functions, and the power receiving operation intended by the user cannot be realized.

The present embodiment provides a configuration and a process for preventing electric power stored in the external device from automatically flowing back to the PowerBank 100 when the charging operation from the PowerBank 100 to the external device completes, in order to solve the above-described new problem.

That is, the present invention provides a mechanism for preventing the power supply direction from reversing and the supplied electric power from immediately returning even if the USB cable is left connected after the charging completes, when the DRP function capable of both receiving the power supply and supplying electric power is implemented in each of the devices conforming to the USB Type-C standard and the USB Power Delivery standard which are capable of both receiving the power supply and supplying electric power by a single port.

More specifically, the PowerBank according to the present embodiment stops substantially executing the sequences as the power receiving side (Sink) unless a predetermined condition is satisfied when the power supply from the secondary battery is disabled during the supply of the power stored in the secondary battery as the power supply side (Source) to the destination. By employing such a solving mean, the above-mentioned problem is solved.

Hereinafter, some embodiments of such a solving mean is described. In the present embodiment, processes that can be realized in the range of the USB Type-C standard, processes that can be realized in the range of the USB Power Delivery standard, processes that can be realized in the range of both the USB Type-C standard and the USB Power Delivery standard, and the like are used as appropriate. Therefore, the controllers used in the present embodiment execute processes related to power reception in accordance with at least one of the USB Type-C standard and the USB Power Delivery standard.

First Embodiment

Figure 4:
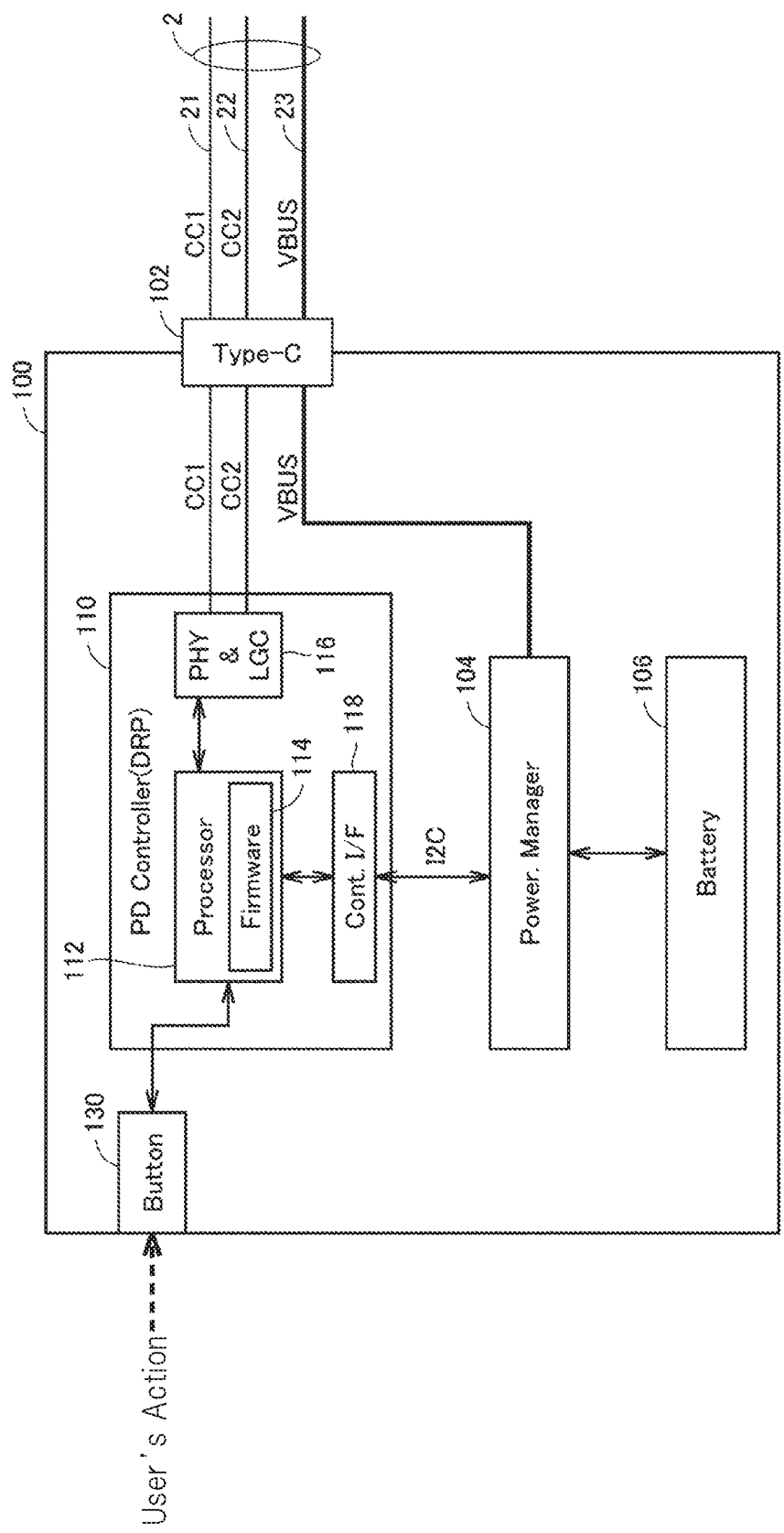
FIG. 4 is a schematic diagram illustrating an exemplary device configuration of a PowerBank according to a first embodiment.

First, an exemplary device configuration of a PowerBank 100 according to First Embodiment is described. FIG. 4 is a schematic diagram showing an exemplary device configuration of the PowerBank 100 according to the first embodiment.

Referring to FIG. 4, the PowerBank 100 includes, as main components, a connector 102, a power manager (Power Manager) 104, a battery 106, a PD controller (PD Controller) 110, and a button 130.

The Connector 102 includes a port for a USB Type-C interface. The power management unit 104 corresponds to a charge/discharge control circuit that controls charge/discharge of the battery 106 in accordance with an instruction from the PD controller 110. Specifically, the power management unit 104 is capable of selectively performing a first charging operation in which the power supplied from the external power source is stored in the battery 106, a second charging operation in which the power supplied from the external device is stored in the battery 106, and a discharging operation in which the power stored in the battery 106 is supplied to the external device.

The battery 106 is a typical example of a secondary battery and a lithium ion secondary battery, a lithium ion polymer secondary battery, a nickel-hydrogen rechargeable battery, or the like is used.

The button 130 is an example of an input unit that receives a user's action, and is typically provided in a housing in which the PD controller 110 is mounted. When the user operates the button 130, the operation content of the button 130 is given to the PD controller 110. As the button 130, a push button or the like that is exposed out of the housing of the PowerBank 100 is assumed.

The PD controller 110 according to the present embodiment provides a port corresponding to DRP that can be both a power supply side (Source) and a power reception side (Sink) according to the USB Type-C standard. That is, the PD controller 110 functions as a DRP, and manages communication with a connection destination via the USB cable 2 and electric power receiving and supplying operations. More specifically, the PD controller 110 includes a processor 112, a signal transmission module (PHY & LGC) 116 and a control interface (Cont. I/F) 118. The processor 112 is coupled to a signal transmission module 116 and a control interface 118.

The processor 112 corresponds to a sequence executing unit that executes a sequence according to the USB Type-C standard and the USB PD standard. The processor 112 executes a firmware 114, which is an example of a control program, thereby providing the following processing and functions. Implementation using the processor 112 and the firmware 114 can facilitate sequence modification, version upgrade, and the like.

The signal transmission module 116 transmits and receives signals to and from a destination via communication lines (a first communication line (CC1) 21 and a second communication line (CC2) 22) in the USB cable 2. The first communication line and the second communication line 22 may be collectively referred to as a "communication line".

The control interface 118 controls the power management unit 104 that controls charging and discharging of the battery 106. More specifically, the control interface 118 provides a control instruction for controlling the charging/discharging operation of the power management unit 104 in accordance with an instruction from the processor 112. For example, the control interface 118 may exchange control signals with the power management unit 104 in accordance with the I2C interface.

Electric power is exchanged between the battery 106 and an external device via a VBUS 23 in the USB cable 2. The USB cable 2 includes a shield wire (not shown).

Figure 5:
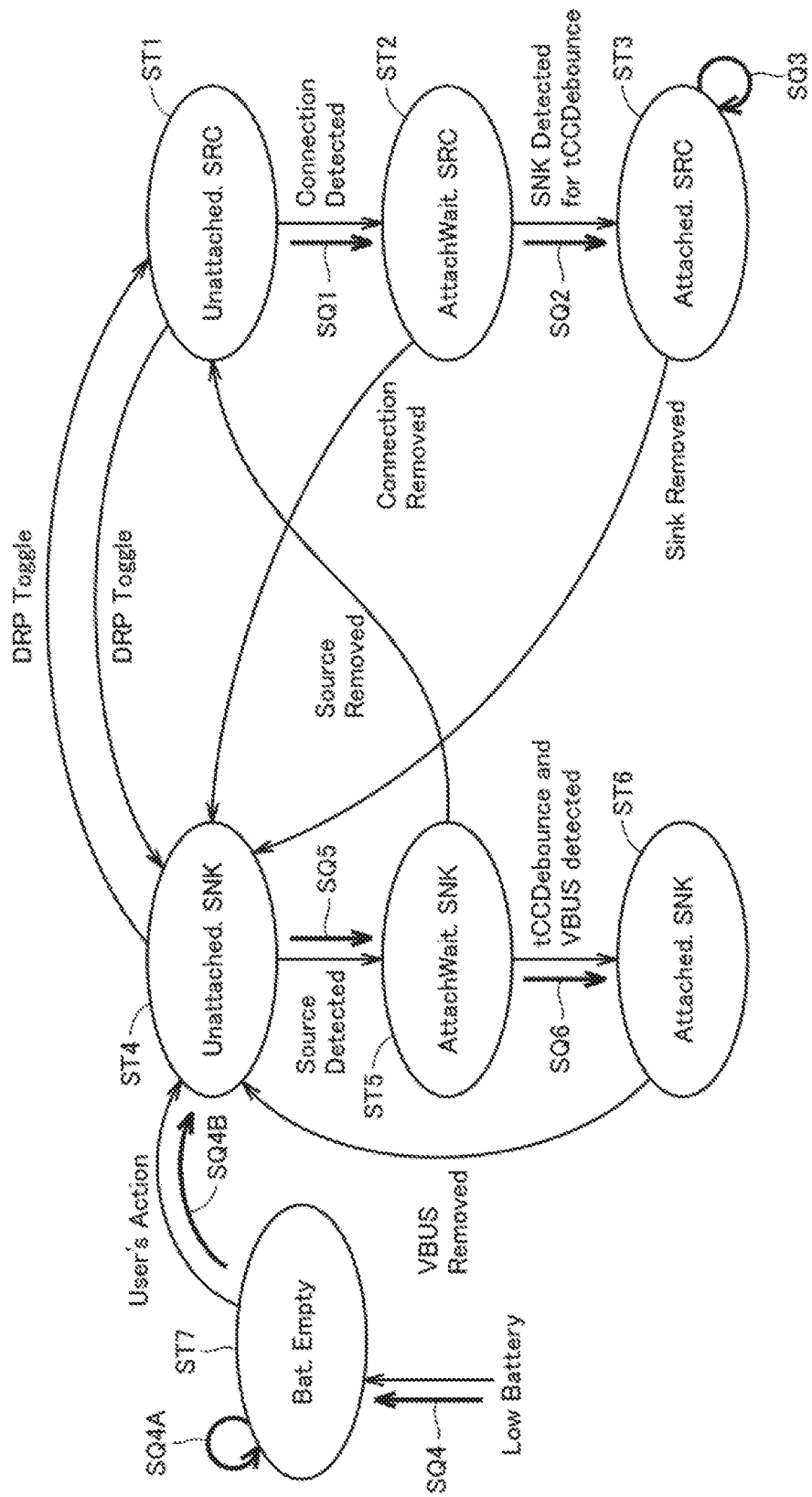
FIG. 5 shows a summary of the state transitions of the PowerBank according to the first embodiment.

Next, state transitions of the PowerBank 100 according to the first embodiment are described. FIG. 5 is a diagram showing a main part of state transitions of the PowerBank 100 according to the first embodiment. The state transition shown in FIG. 5 differs from the state transition of a device in charge of Port Role of DRP according to the USB Type-C standard shown in FIG. 1 in that a Bat.Empty state (ST7) is added. In FIG. 5, the substantially same states as the states shown in FIG. 1 are denoted by the same reference numerals. The description of the states described with reference to FIG. 1 is not be repeated.

The PowerBank 100 supplies electric power to the external device in the Attached.SRC state (ST3), but when the discharge voltage of the battery 106 (secondary battery) drops to a predetermined value, the discharge voltage becomes an Low Battery state and transitions to the Bat.Empty state (ST7). In the Bat.Empty state (ST7), an acceptance of a predetermined user's action is a transition condition, and the Bat.Empty state (ST7) is maintained until an acceptance of a predetermined user's action.

In the Bat.Empty state (ST7), when a predetermined user's action is accepted, the state transitions to the Unattached.SNK state (ST4). As the predetermined user's action, for example, pressing the buttons 130 equipped on the PowerBank 100 shown in FIG. 4 is assumed.

That is, in the first embodiment, when electric power is supplied in the Attached.SRC state (ST3) and the power becomes Low Battery, the state transits to the Bat.Empty state (ST7) instead of the Unattached.SNK state (ST4) as it is, and then the state transits to the Unattached.SNK state (ST4) in response to a predetermined user's action.

In this manner, the processor 112 of the PD controller 110 first supplies the power stored in the battery 106 (secondary battery) as the power supply (Source) to the connection destination. When the power supply from the battery 106 (secondary battery) is disabled during the supply of the power to the destination, the processor 112 of the PD controller 110 causes the Bat.Empty state (ST7) to maintain the state unless a predetermined condition is satisfied, and stops substantially executing the sequence as the power receiving side (Sink).

Further, the processor 112 of the PD controller 110, responds to a signal indicating a user's action, determines that a predetermined condition has been satisfied, and substantially executes sequences as a Sink. The signal indicating the user's action is a signal from the button 130.

That is, in the first embodiment, when the power receiving side enters the Low Battery state, the state transitions to the Bat.Empty state and a condition for a predetermined user's action (corresponding to a predetermined condition for executing the sequence as the power receiving side) is imposed on the return from the Bat.Empty state. By adopting such a configuration, there is provided a mechanism in which the PowerBank 100 automatically changes to the power receiving side after the power is supplied by the PowerBank 100 and the power is not received from the external device without the involvement of the user.

Figure 6:
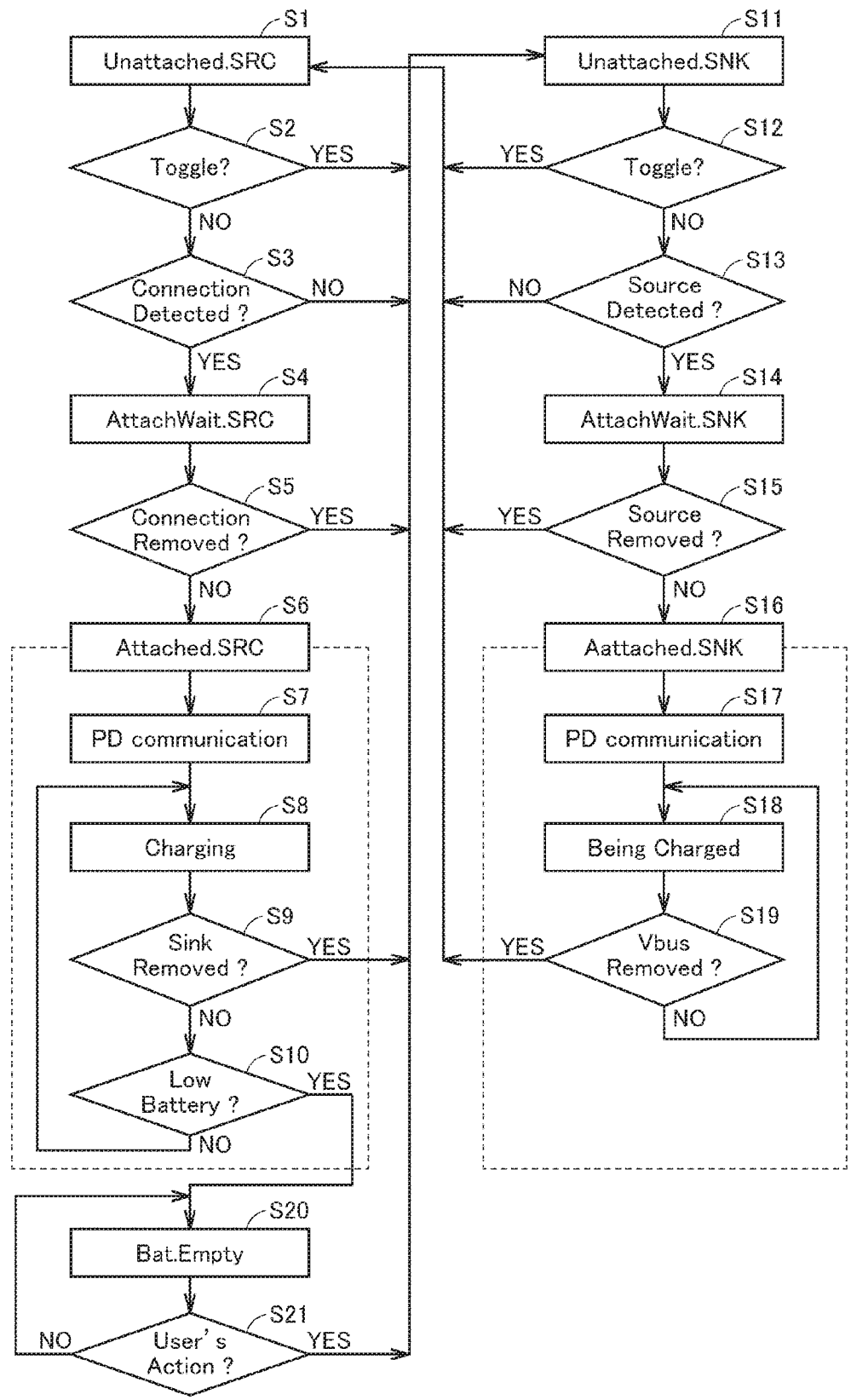
FIG. 6 is a flowchart illustrating a processing procedure pertaining to a power receiving operation of a PowerBank according to the first embodiment.

Next, the processing procedure performed in the PowerBank 100 according to the first embodiment is described. FIG. 6 is a flow chart showing the process procedures relating to the power receiving operation of the PowerBank 100 according to the first embodiment. Each step shown in FIG. 6 is typically realized by the processor 112 of the PD controller 110 executing the firmware 114, which is a control program. Therefore, the execution subject of each step shown in FIG. 6 is typically the processor 112.

The flowchart shown in FIG. 6 differs from the flowchart shown in FIG. 3 in that the processes of steps S20 and S21 are added. In FIG. 6, processing substantially the same as the processing shown in FIG. 3 is denoted by the same reference numerals. The description of the processing described with reference to FIG. 3 is not repeated.

Referring to FIG. 6, in the Unattached.SNK state, the PowerBank 100 determines whether or not the discharging voltage of the battery 106 (secondary battery) has dropped to a predetermined value and is in the Low Battery state (S10). If it is not Low Battery (NO in step S10), the processes of step S8 and subsequent steps are repeated.

On the other hand, when the Low Battery state is entered (YES in step S10), the PowerBank 100 transitions to the Bat.Empty state (step S20). Then, in the Bat.Empty state, the PowerBank 100 determines whether or not a predetermined user's action has been accepted in operation S21. If the predetermined user's action is not accepted (NO in step S21), the processing in step S20 and subsequent steps is repeated.

On the other hand, when the predetermined user's action is accepted (YES in S21), the PowerBank 100 transitions to the Unattached.SNK state (ST4).

Thus, once the PowerBank 100 of the power supply side becomes Low Battery, the power supply side enters the processing routine processing (Steps S20 and S21) including the Bat.Empty state introduced in the first embodiment, and cannot exit from this state until the operation is explicitly performed by the user.

Next, some operation examples of the PowerBank 100 according to the first embodiment is described.

Figure 7:
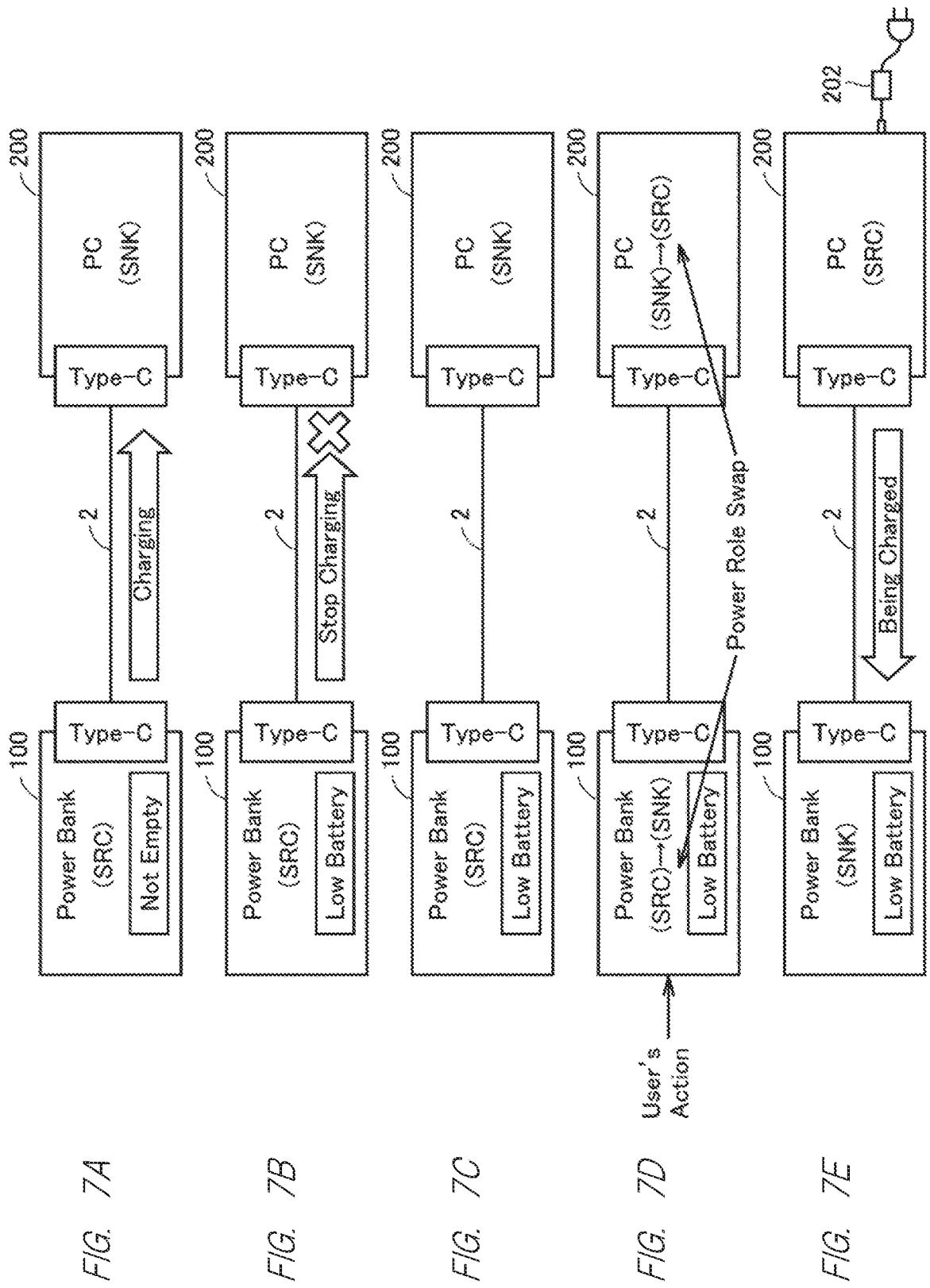
FIG. 7A thru FIG. 7E are schematic diagrams showing an exemplary operation of a PowerBank according to a first embodiment.

FIG. 7 is a schematic diagram showing an exemplary operation of the PowerBank 100 according to the first embodiment. FIG. 7 shows the operation at the time of supplying electric power from the PowerBank 100 to the PC 200.

Referring to FIG. 7A, first, a PowerBank 100 on the power supply side and a PC 200 on the power reception side are connected. Then, the Port Role of the PowerBank 100 is turned Source, and the supply of electric power from the PowerBank 100 to the PC 200 is started, which corresponds to the state transition of the sequential SQ1-SQ3 shown in FIG. 5.

Thereafter, the supply of electric power from the PowerBank 100 to the PC 200 is continued, and finally, when the discharge voltage of the secondary cell in the PowerBank 100 drops to a predetermined value, as shown in FIG. 7B, the PowerBank 100 is turned Low Battery, and the supply of electric power from the PowerBank 100 to the PC 200 is stopped. In the Low Battery state, the PowerBank 100 enters the Bat.Empty state (ST7 in FIG. 5) (corresponding to the state transitions of the sequential SQ4 shown in FIG. 5).

As shown in FIG. 7C, in the Bat.Empty state, the power receiving/supplying operation is not performed, and the state is maintained as it is until a predetermined user's action is performed (corresponding to the sequential SQ4A shown in FIG. 5).

Then, when a predetermined user's action (in the first embodiment, the user presses the button 130 (FIG. 4)) is performed, the PowerBank 100 transitions from the Attached.SRC state (ST3) to the Unattached.SNK state (ST4) (corresponding to the state transition of the sequential SQ4B shown in FIG. 5).

Then, as shown in FIG. 7D, the Port Role of the PowerBank 100 changes from Source to Sink, and the Port Role of the PC 200 changes from Sink to Source.

Then, voltages and currents to be exchanged between the PowerBank 100 and the PC 200 are determined by communication in accordance with the USB PD standard or the like, and as shown in FIG. 7E, the supply of electric power from the PC 200 to the PowerBank 100 starts (corresponding to state transitions of the sequential SQ4-SQ6 shown in FIG. 5).

In the power receiving/supplying operation shown in FIG. 7E, a power adaptor 202 as an external power source may be connected to the PC 200 to supply power from an external power source to the PowerBank 100 instead of from a secondary cell incorporated in the PC 200. This allows the PowerBank 100 to be recharged with an external power source rather than simply returning power from the PC 200 to the PowerBank 100.

Note that the PowerBank 100 in the Low Battery condition may be recharged by a charger.

Figure 8:
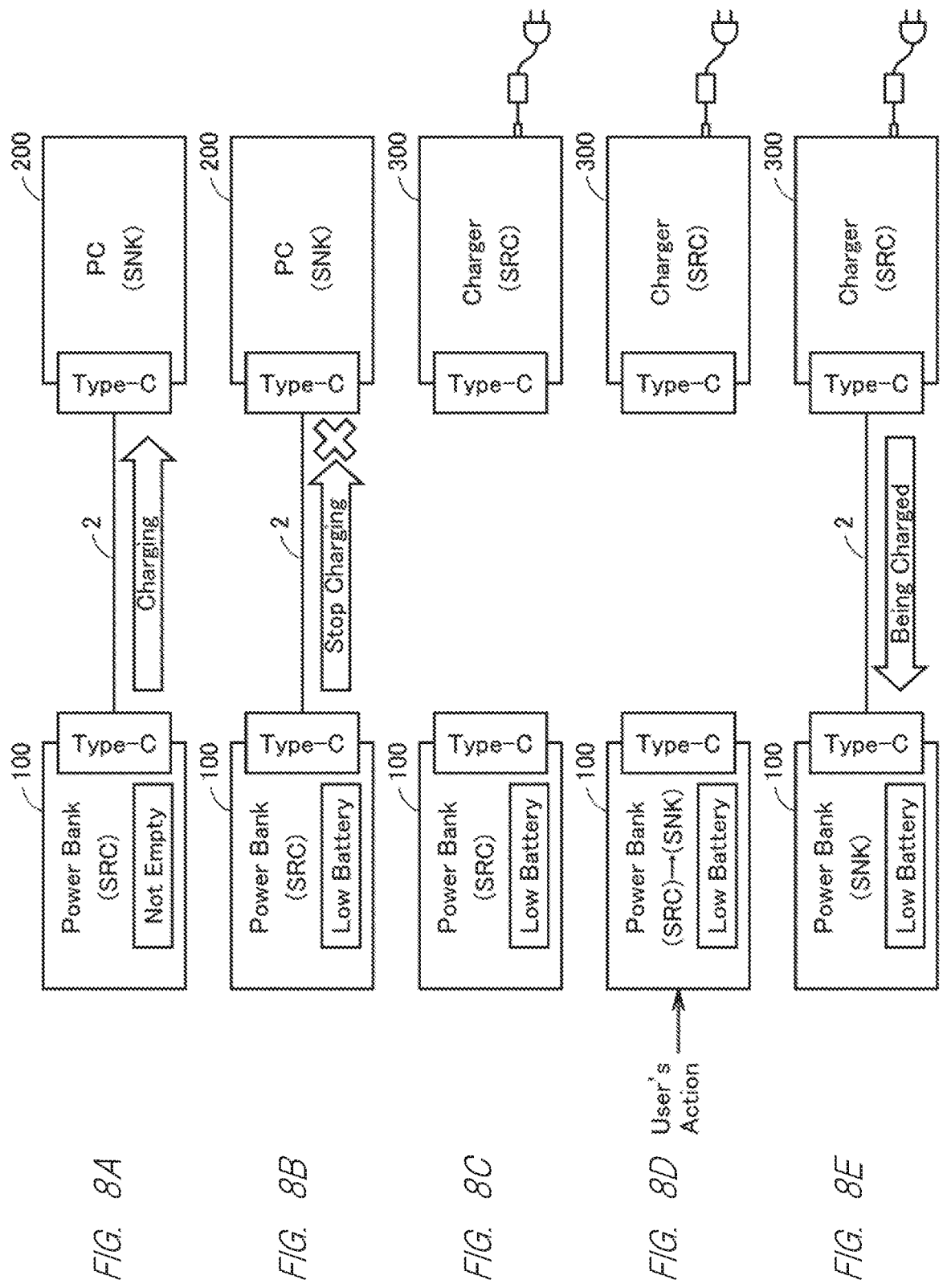
FIG. 8A thru FIG. 8E are schematic diagrams illustrating another operation example of a PowerBank according to the first embodiment.

FIG. 8 is a schematic diagram showing another exemplary operation of the PowerBank 100 according to the first embodiment.

Referring to FIG. 8A, first, a PowerBank 100 on the power supply side and a PC 200 on the power reception side are connected. Then, the Port Role of the PowerBank 100 turns Source, and the supply of electric power from the PowerBank 100 to the PC 200 starts.

Thereafter, the supply of electric power from the PowerBank 100 to the PC 200 is continued, and finally, when the discharge voltage of the secondary cell in the PowerBank 100 drops to a predetermined value, as shown in FIG. 8B, the PowerBank 100 turns Low Battery, and the supply of electric power from the PowerBank 100 to the PC 200 is stopped. The Low Battery state causes the PowerBank 100 to go to the Bat.Empty state, the ST7 of FIG. 5.

Next, as shown in FIG. 8C, in the state where the PowerBank 100 is in the Bat.Empty state, the user removes the USB cable 2 connecting the PowerBank 100 and the PC 200, and prepares the charger (Charger) 300.

Subsequently, when a predetermined user's action (in the first embodiment, the user presses the button 130 (FIG. 4)) is performed, the PowerBank 100 transitions from the Attached.SRC state (ST3) to the Unattached.SNK state (ST4). Then, as shown in FIG. 8D, the Port Role of the PowerBank 100 changes from Source to Sink. The Port Role of the charger 300 is Source fixed.

Further, as shown in FIG. 8E, when the PowerBank 100 and the charger 300 are connected by the USB cable 2, the voltage and current to be exchanged between the PowerBank 100 and the charger 300 is determined by communication in accordance with the USB PD standard or the like, and electric power starts supplying from the charger 300 to the PowerBank 100.

This sequence of operations allows the PowerBank 100 to be recharged by an external power source after electric power is supplied from the PowerBank 100 to the PC 200.

In the first embodiment, when the PowerBank 100 in which the DRP function is implemented is in the Low Battery state, the sequence according to the standard (USB Type-C and USB PD standard) is continued only when the user performs an explicit action (e.g., pressing the button 130).

By such an explicit action of the user, as shown in FIG. 7, the PowerBank 100 and the PC 200 may be kept connected, and an operation for allowing the power to return from the PC 200 to the PowerBank 100 may be performed at the user's discretion. Whether or not the power adaptor 202 is connected to the PC 200 can be determined by the user.

Alternatively, as shown in FIG. 8, in order to recharge the PowerBank 100, the destination may be changed from the PC 200 to the charger 300, and then an explicit action may be given to the PowerBank 100.

In the first embodiment, the PowerBank 100 intends to continue supplying electric power to the external device, but it is possible to avoid a situation in which the power is returned from the external device to the PowerBank 100 at any time without the user's involvement.

Second Embodiment

The Bat.Empty state (ST7 of FIG. 5) employed in the PD controller 110 in accordance with the above-described first embodiment can be realized by changing the firmware 114 that executes standard sequences. Alternatively, hardware may be utilized to implement the Bat.Empty state substantially. Hereinafter, an example of a configuration of circuits for realizing the Bat.Empty state using hardware is described.

Figure 9:
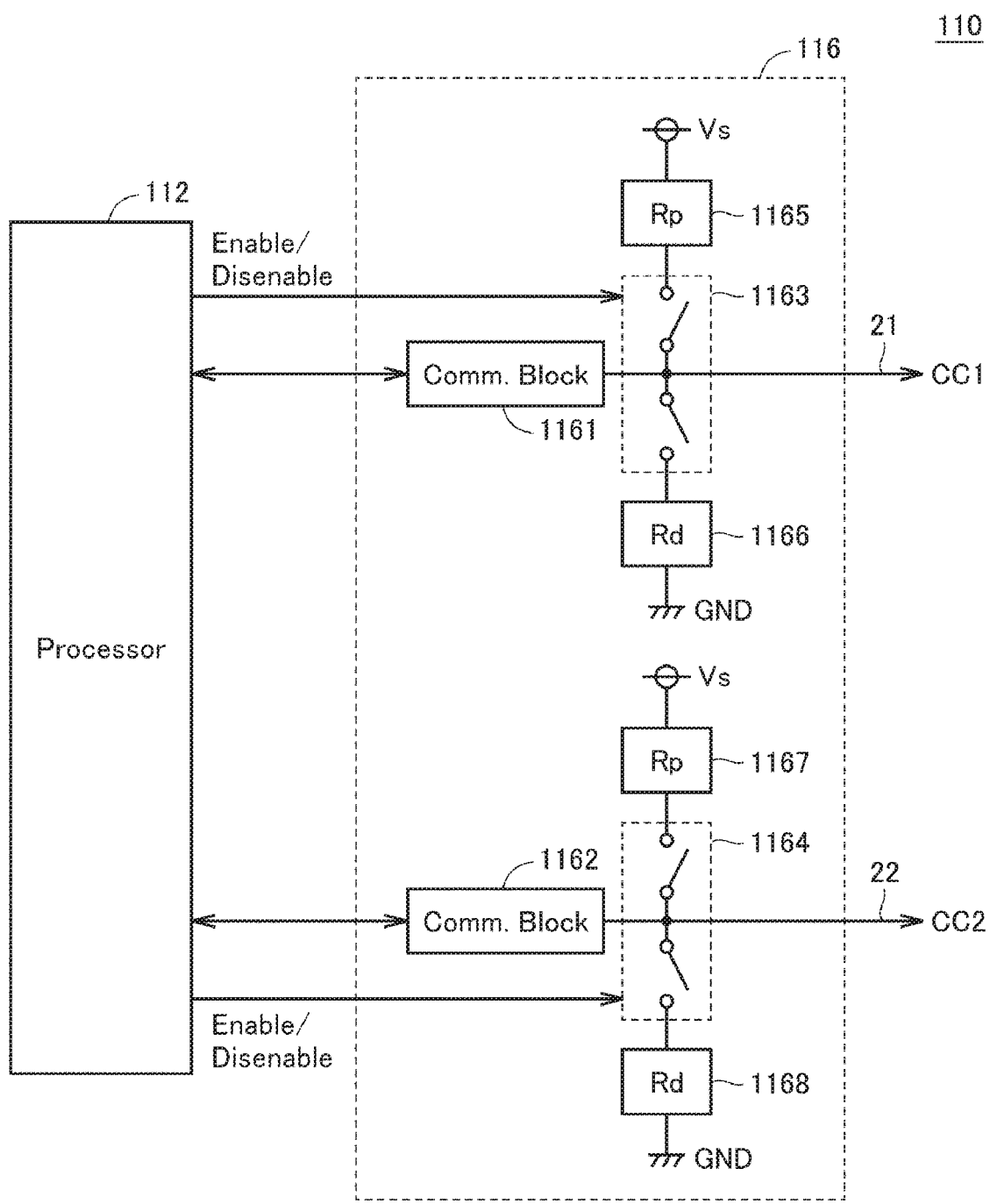
FIG. 9 is a schematic view illustrating an example of a circuit configuration of a PD controller according to a second embodiment.

FIG. 9 is a schematic diagram showing an example of the circuit configuration of the PD controller 110 according to the second embodiment. Referring to FIG. 9, the signal transmission module 116 of the PD controller 110 exchanges PDO information related to PD communication via a first communication line (CC1) 21 and a second communication line (CC2) 22.

More specifically, the signal transmission module 116 includes a first communication control block (Comm.Block) 1161 and a second communication control block (Comm-.Block) 1162.

The first communication control block 1161 outputs the data received via the first communication line 21 to the processor 112, and transmits the data from the processor 112 via the first communication line 21. Similarly, the second communication control block 1162 outputs data received via the second communication line 22 to the processor 112 and transmits data from the processor 112 via the second communication line 22.

The signal transmission module 116 has resistors connected between the communication lines (the first communication line 21 and the second communication line 22) and the power supply potential Vs and the ground potential GND, respectively, in order to detect connection with a connection destination.

Specifically, a pull-up resistor 1165 having a resistance value Rp is connected to the first communication line 21, and a pull-down resistor 1166 having a resistance value Rd is connected to the ground potential GND. Similarly, a pull-up resistor 1167 having a resistance value Rp is connected to the second communication line 22 and a pull-down resistor 1168 having a resistance value Rd is connected to the ground potential GND.

The connection between the PowerBank 100 and the connection destination is detected by mutually detecting the resistances Rp and Rd existing in the first communication line 21 and the second communication line 22.

By using such a mechanism for detecting the connection, the detection of the connection with the connection destination can be invalidated by electrically disconnecting the pull-up resistors 1165 and 1167 and the pull-down resistors 1166 and 1168 from the communication lines, i.e., the first communication line 21 and the second communication line 22. For this purpose, the signal transmission module 116 has switches 1163 and 1164.

That is, the switches 1163 and 1164 electrically connect/disconnect a path leading from the communication line (the first communication line 21 and the second communication line 22) to the power supply potential Vs and the ground potential GND. More specifically, the switch 1163 electrically connects/disconnects the pull-up resistor 1165 and the pull-down resistor 1166 to/from the first communication line 21 in accordance with a control signal from the processor 112. Similarly, the switch 1164 electrically connects/disconnects the pull-up resistor 1167 and the pull-down resistor 1168 to/from the second communication line 22 in accordance with a control signal from the processor 112.

When the processor 112 is in a Low Battery state, it provides a shut-off command to the switches 1163, 1164. Then, the pull-up resistor 1165 and the pull-down resistor 1166 are disconnected from the first communication line 21, and the pull-up resistor 1167 and the pull-down resistor 1168 are disconnected from the second communication line 22. The separated state is maintained. As a result, the Port Role of the PowerBank 100 does not become either Source or Sink, and cannot transit to the state for performing the power receiving operation. Therefore, the Bat.Empty state (ST7 in FIG. 5) is maintained.

As described above, when the power supply from the battery 106 becomes impossible during the supply of the power stored in the battery 106 (secondary battery) as the power supply side (Source) to the destination, the processor 112 of the PD controller 110 gives a control signal to the switches 1163 and 1164 of the signal transmission module 116 to electrically cut off the path leading from the communication line to the power supply potential Vs and the ground potential GND.

Thereafter, in response to a predetermined user's action (in the second embodiment, pressing of the button 130 (FIG. 4) by the user), the processor 112 gives a connection command to the switches 1163 and 1164. Then, the pull-up resistor 1165 and the pull-down resistor 1166 are electrically connected to the first communication line 21, and the pull-up resistor 1167 and the pull-down resistor 1168 are electrically connected to the second communication line 22.

Thus, the pull-up resistors 1165 and 1167 and the pull-down resistors 1166 and 1168 are electrically connected to the communication line in response to the user's intentional involvement to resume the power receiving operation.

Figure 10:
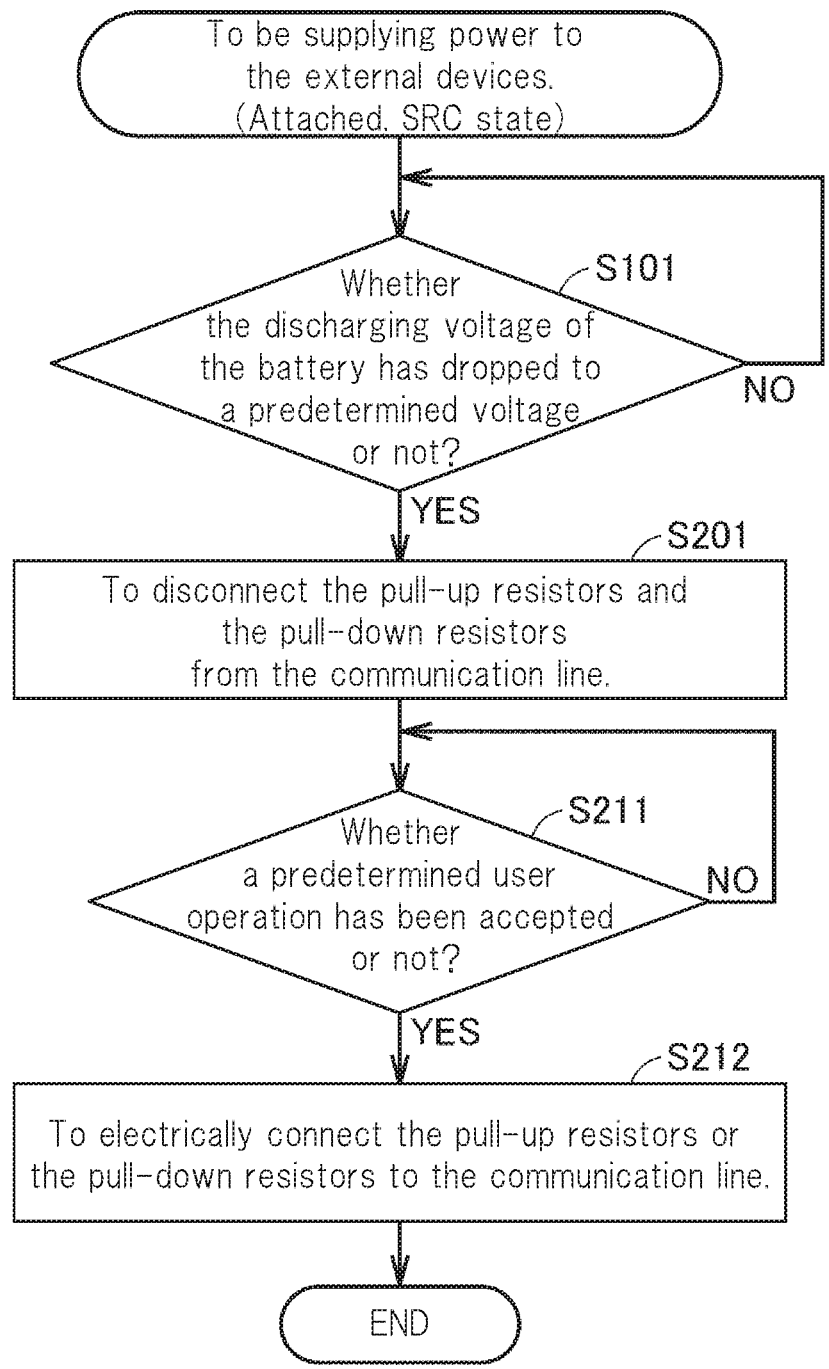
FIG. 10 a flow chart illustrating a main part of a processing procedure pertaining to a power receiving operation of a PowerBank according to the second embodiment.

FIG. 10 is a flow chart showing a main part of a process related to the power receiving operation of the PowerBank 100 according to the second embodiment. Each step shown in FIG. 10 is typically realized by the processor 112 of the PD controller 110 executing the firmware 114, which is a control program. Therefore, the execution subject of each step shown in FIG. 10 is typically the processor 112.

Referring to FIG. 10, the processor 112 determines whether the discharging voltage of the battery 106 has dropped to a predetermined voltage in the Attached.SRC state while power is supplied to the external devices (step S101). If the discharging voltage of the battery 106 has not decreased to a predetermined value (NO in step S101), the process of step S101 is repeated.

If the discharged voltage of the battery 106 has dropped to a predetermined value (YES in step S101), the processor 112 gives a control command to the switches 1163 and 1164 to disconnect the pull-up resistors 1165 and 1167 and the pull-down resistors 1166 and 1168 from the communication line (the first communication line 21 and the second communication line 22) (step S201).

In step S211, the processor 112 determines whether a predetermined user's action has been accepted. If the predetermined user's action is not accepted (NO in step S211), the determination of step S211 is repeated.

On the other hand, when a predetermined user's action is received (YES in step S211), the processor 112 gives a control command to the switches 1163 and 1164 to electrically connect the pull-up resistors 1165 and 1167 or the pull-down resistors 1166 and 1168 to the communication line (the first communication line 21 and the second communication line 22) (step S212). As a result, the process in the Low Battery status ends.

Configurations, processes, and the like other than those described above are the same as those in the First Embodiment described above, and therefore, detailed description thereof will not be repeated here.

According to the second embodiment, it is possible to realize a PD controller capable of solving the above-described problems by making only a slight change to a standard PD controller according to the USB Type-C standard and the USB PD standard.

Third Embodiment

In the First Embodiment and the Second Embodiment described above, the operation of the button 130 is exemplified as the user's action indicating the intentional involvement of the user, but the present invention is not limited to this, and an input device that accepts an arbitrary user's action can be used. For example, a device such as a touch panel, an image input (e.g., a gesture input using image recognition), a voice input (e.g., an instruction by a user's utterance), or the like may be used.

That is, the processor 112 of the PD controller 110 may determine that a predetermined condition is satisfied in response to a signal indicating any user's action, and may execute a sequence as a Sink.

Further, the intention of the user may be implicitly detected based on not only an explicit action by the user but also information such as the surrounding environment.

For example, an optical sensor or the like may be used to allow transitions from the Bat.Empty state (ST7) when the brightness reaches a certain level. This typically assumes a situation in which power is supplied from the PowerBank 100 to external devices during the night, and the PowerBank 100 is recharged in the morning.

Alternatively, a temperature sensor may be used to allow transitions from the Bat.Empty state (ST7) when it detects that the ambient temperature has risen to a predetermined value. Similar to the above-described optical sensor, for example, it is assumed that power is supplied from the PowerBank 100 to external devices during the night, and the PowerBank 100 is recharged in the morning.

According to the third embodiment, the interruption or continuation of the power receiving operation can be judged by explicitly or implicitly detecting the intent of the user by using any of the input device or sensor depending on the usage form of the PowerBank 100 of the respective users. As a result, it is possible to avoid a situation in which the power receiving operation unintended by the user is automatically executed.

Fourth Embodiment

In the above-mentioned First Embodiment to Third Embodiment, the suspension and resumption of the state transition are realized by using hardware such as a button, but in the Fourth Embodiment, an example of a configuration realized by software processing is described.

In the fourth embodiment, the PDO information sent by the communication (PD communication) in accordance with the USB PD standard executed after the device functioning as a Source and the device functioning as a Sink are combined (Attached.xx) is used for the operation continuation condition. As long as the PDO information does not satisfy the predetermined operation continuation condition, the power receiving operation is controlled not to be automatically started. In other words, the sequence on the power receiving side is executed on the condition that the operation continuation condition is satisfied.

After the PowerBank 100 turns Low Battery, it automatically receives electrical power from the Source device when it is coupled to the Source device. In the fourth embodiment, when the predetermined operation continuation condition (the Low Battery state and the state in which power is scheduled to be received from the destination) is not satisfied, a new transition flow is added which is temporarily returned to the connection confirmation state with the destination.

As described above, in the fourth embodiment, when the power supply from the battery 106 is disabled while the power stored in the battery 106 (secondary battery) is supplied to the destination as the power supply side (Source), the processor 112 of the PD controller 110 stops substantially executing the sequence as the power receiving side (Sink) unless the predetermined operation continuation condition is satisfied.

Figure 11:
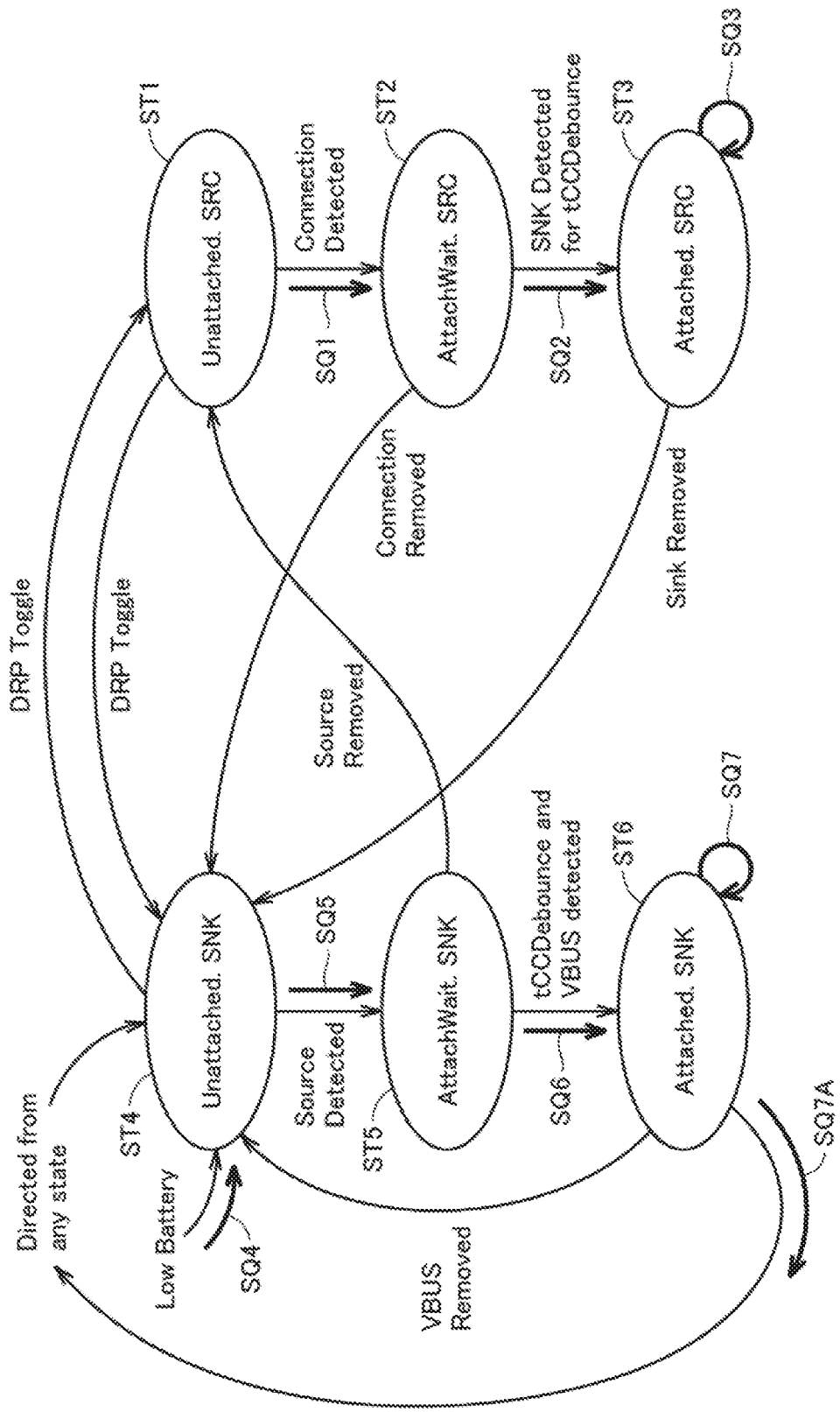
FIG. 11 shows a summary of the state transitions of the PowerBank according to a fourth embodiment.

Next, state transitions of the PowerBank 100 according to the fourth embodiment are described. FIG. 11 is a diagram showing a main part of state transitions of the PowerBank 100 according to the fourth embodiment. The state transition shown in FIG. 11 is different from the state transition of the device in charge of Port Role of DRP according to the USB Type-C standard shown in FIG. 1 in that a transition flow for transitioning from the Attached.SNK state (ST6) to the Unattached.SNK state (ST4) is added. In FIG. 11, states substantially the same as the states shown in FIG. 1 are denoted by the same reference numerals. The description of the states described with reference to FIG. 1 is not be repeated.

Referring to FIG. 11, the PowerBank 100 supplies electric power to external devices in the Attached.SRC state (ST3), but when the discharge voltage of the battery 106 (secondary battery) drops to a predetermined value, the discharge voltage transitions to the Unattached.SNK state (ST4) through the Low Battery state. Along with this state transition, the Port Role of the PowerBank 100 changes from Source to Sink, and the Port Role of the PC 200 changes from Sink to Source.

The PowerBank 100 and the PC 200 are connected again in accordance with the USB Type-C standard. In this reconnection, the PowerBank 100 performs PD communication in accordance with the USB PD standard to determine the magnitude of the supplied voltage and current, etc. That is, the sequence as the Sink includes a process of receiving PDO information, which is information on a destination to which the PDO is connected, and the sequence includes a process of receiving PDO information, which is information on a destination to which the PDO is connected. The PDO information exchanged in the PD communication includes information on a Source device. The operation continuation condition used in the fourth embodiment includes at least a part of PDO information which is information on a connection destination. When the operation continuation condition using the PDO information is not satisfied, the PDO information transits to the Unattached.SNK state ST4.

On the other hand, when the operation continuation condition is satisfied, electric power is supplied from the Source in accordance with the sequences according to the USB Type-C standard and the USB PD standard.

As described above, in the fourth embodiment, after the PowerBank 100 turns Low Battery, the operation continuation condition using the PDO information from the Source is judged before the Port Role is changed from Source to Sink and the power receiving operation is started. This makes it possible to avoid the power receiving operation unintended by the user.

First, the PDO information that is sent by the PD communication is described in detailed. According to the USB PD standard, PDO information includes the following information.

(1) Fix supply or not, (2) DRP (Dual Role Power) or not, (3) USB Suspended Supported or not, (4) Unconstrained Power or not, (5) USB Communication Capable (yes or no), (6) Dual Role Data or not (7) Unchunked Extended Messages Supported or not, (8) Peak Current, (9) Voltage (in 50 mV units), and (10) Maximum Current (in 10 mA units). The PDO information as described above includes various information in addition to the available voltage and current information. As a condition (operation continuation condition) for continuing the power receiving/supplying operation in which the Port Role of the PowerBank 100 becomes Sink and the power is supplied from the external device, it is preferable to use the information of whether or not the DRP function is implemented in the connected Source (the information of (2) DRP (Dual Role Power) or not) described above). As described above, the present embodiment aims to solve the problem that occurs when the DRP function is mounted on both of the two devices.

More specifically, the operation continuation condition includes that "(2) DRP (Dual Role Power)" is "False". Conversely, the condition for executing the sequence as the power receiving side (Sink) after the PowerBank 100 turns Low Battery includes that the connection destination is not a DRP which can be either the power supplying side (Source) or the power receiving side (Sink).

Further, the operation continuation condition may include that "(4) Unconstrained Power" is "True" (i.e., there is no restriction on the electric power supplied from the Source). No restriction on the power supplied from the Source means that a power adaptor or the like is connected to the Source device and that the power that can be supplied is not limited. Conversely, the condition for interrupting the sequence as the Sink after the PowerBank 100 turns Low Battery includes that there is a restriction on the electric power to be supplied from the destination to which the PowerBank 100 is connected.

The operation continuation condition used in the present embodiment may include that the DRP function is not implemented in the Source of the connection destination, and more preferably, may include that there is no restriction on the electric power supplied from the Source of the connection destination. When these two conditions are used as the operation continuation conditions, the logical sum of the two conditions is used. That is, if the DRP function is not mounted on the Source of the connection destination, or if there is no restriction on the electric power supplied from the Source of the connection destination, the operation continuation condition is satisfied, and the sequence as the power receiving side (Sink) is executed.

For example, suppose that the PowerBank 100 turns Low Battery while electric power is being supplied to a PC 200 to which the power adaptor is not connected. If the USB cable 2 between the PowerBank 100 and the PC 200 is left connected, the PowerBank 100 recognizes that "the access point is equipped with the DRP function and is not connected to the power adapter, etc." based on the PDO information from the PC 200. Then, the PowerBank 100 temporarily returns to the Unattached.SNK state (ST4 in FIG. 11), which is a state for confirming connection with the destination, without starting the power receiving operation. Thereafter, the state transitions in the order of Unattached.SNK (ST4 in FIG. 11), AttachWait.SNK (ST5 in FIG. 11), and Attached.SNK (ST6 in FIG. 11), and the PD communication is executed again. As long as the state of the PC 200 does not change, the operation continuation condition is not satisfied, so that the state transition from Attached.SNK to Unattached.SNK is repeated. That is, the PowerBank 100 does not initiate the power receiving operation unless the PC 200 status changes.

By adopting the operation continuation condition as described above, it is possible to avoid a situation in which the electric power is returned from the external device to the PowerBank 100 at any time without the user's involvement, although the power is continuously supplied from the PowerBank 100 to the external device.

Figure 12:
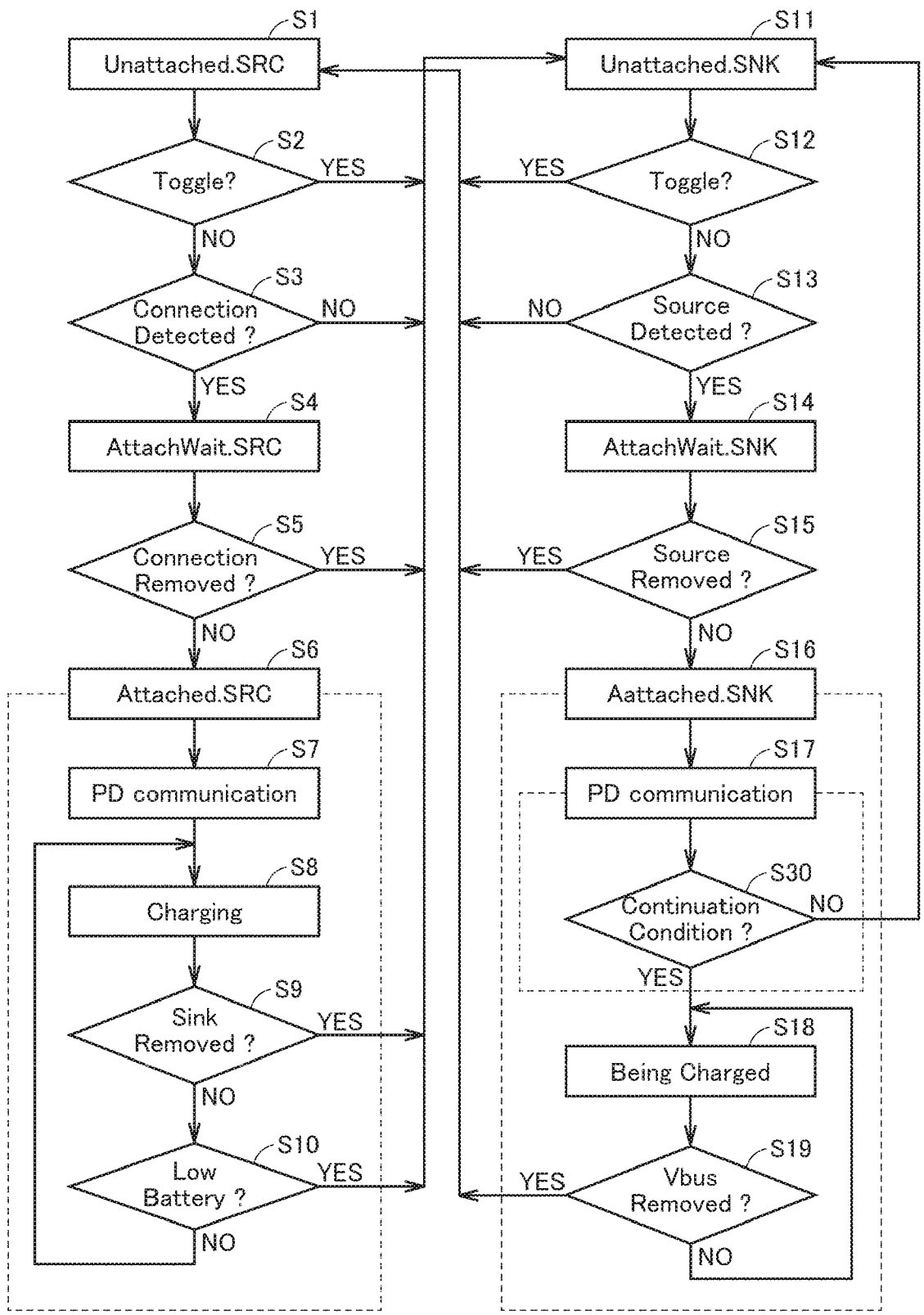
FIG. 12 is a flowchart illustrating a processing procedure pertaining to a power receiving operation of a PowerBank according to the fourth embodiment.

Next, a processing procedure executed by the PowerBank 100 according to the fourth embodiment is described. FIG. 12 is a flow chart showing the process procedures relating to the power receiving operation of the PowerBank 100 according to the fourth embodiment. Each step shown in FIG. 12 is typically realized by the processor 112 of the PD controller 110 executing the firmware 114, which is a control program. Therefore, the execution subject of each step shown in FIG. 12 is typically the processor 112.

The flowchart shown in FIG. 12 differs from the flowchart shown in FIG. 3 in that the process of step S30 is added. In FIG. 12, substantially the same processes as those shown in FIG. 3 are denoted by the same reference numerals. The description of the processing described with reference to FIG. 3 is not repeated.

Referring to FIG. 12, in the Unattached.SNK state, the PowerBank 100 determines whether or not the discharging voltage of the battery 106 (secondary battery) has dropped to a predetermined value and is in the Low Battery state (S10). If it is not Low Battery (NO in step S10), the processes of step S8 and subsequent steps are repeated.

On the other hand, when the Low Battery state is entered (YES in step S10), the PowerBank 100 transitions to the Unattached.SNK state (step S11). Then, when the predetermined condition is satisfied, the PowerBank 100 executes the PD communication through the transition to the AttachWait.SNK state (step S14) and the transition to the Attached.SNK state (step S16) (step S17).

At this time, the PowerBank 100 determines whether or not the operation continuation condition (denoted as "Continuation Condition") is satisfied based on the PDO information acquired by the PD communication (step S30). If the operation continuation condition is not satisfied (NO in S30), the PowerBank 100 transitions to the Unattached.SNK state.

On the other hand, if the operation continuation condition is not satisfied (YES in step S30), the PowerBank 100 starts receiving electric power from the Source devices (step S18).

As described above, unless the operation continuation condition based on the PDO information from the Source is satisfied, the PowerBank 100 power receiving operation is not started.

Next, some examples of operation of the PowerBank 100 according to the fourth embodiment are described.

FIG. 13 is a schematic diagram showing an exemplary operation of the PowerBank 100 according to the fourth embodiment. FIG. 13 shows the operation at the time of supplying electric power from the PowerBank 100 to the PC 200.

Referring to FIG. 13A, first, a PowerBank 100 on the power supply side and a PC 200 on the power reception side are connected. Then, the Port Role of the PowerBank 100 turns Source, and electric power starts to be supplied from the PowerBank 100 to the PC 200, which corresponds to the state transition of the sequential SQ1-SQ3 shown in FIG. 11.

Thereafter, the supply of electric power from the PowerBank 100 to the PC 200 is continued, and finally, when the discharge voltage of the secondary cell in the PowerBank 100 drops to a predetermined value, as shown in FIG. 13B, the PowerBank 100 turns Low Battery, and the supply of electric power from the PowerBank 100 to the PC 200 is stopped.

As shown in FIG. 13C, if the USB cable 2 between the PowerBank 100 and the PC 200 is kept connected, when the DRP function is also implemented in the PC 200, the Port Role of the PowerBank 100 changes from Source to Sink, and the Port Role of the PC 200 changes from Sink to Source (corresponding to the state transition of the sequence SQ5, SQ6 shown in FIG. 11). A PD communication is then performed between the PowerBank 100 and the PC 200.

As shown in FIG. 13(D), it is "Unconstrained Power"="False" when the power adapter 202 is not connected to the PC 200. Since the DRP function is implemented in the PC 200, "DRP"="True". During the PD communication, the PowerBank 100 determines that the operation continuation condition is satisfied based on the PDO information, and suspends the power receiving operation. That is, the magnitude of the supplied voltage and current is not determined between the PowerBank 100 and the PC 200, and the power receiving operation is not started, which corresponds to the sequence SQ7A and the sequence SQ5, SQ6 shown in FIG. 11.

On the other hand, as shown in FIG. 13E, when the power adaptor 202 is connected to the PC 200, the power adaptor 202 is turned "Unconstrained Power"="True", so that the PowerBank 100 determines that the operation continuation condition is satisfied based on the PDO information and continues the power receiving operation during the PD communication. That is, between the PowerBank 100 and the PC 200, the magnitude of the voltage and current to be supplied is determined, and the power receiving operation is started, which corresponds to the sequential SQ7 shown in FIG. 11.

As described above, when the operation continuation condition is not satisfied, the state transitions are repeated in the order of the Unattached.SNK state (ST4), the Attach-Wait.SNK state (ST5), and the Attached.SNK state (ST6). In order to exit from such a loop of state transition, an explicit action by the user is required. In the case shown in FIG. 13, the user's explicit action corresponds to connecting the power adaptor 202 to the PC 200. By connecting the power adaptor 202, the condition of "Unconstrained Power"="False" is not satisfied (i.e., "Unconstrained Power"="True"). As a result, since the operation continuation condition is satisfied, the PowerBank 100 continues the power receiving operation and receives power from the PC 200.

As another explicit action by the user, the PowerBank 100 that has become Low Battery may be recharged by the charger.

FIG. 14 is a schematic diagram showing another exemplary operation of the PowerBank 100 according to the fourth embodiment.

Referring to FIG. 14A, first, a PowerBank 100 on the power supply side and a PC 200 on the power reception side are connected. Then, the Port Role of the PowerBank 100 turns Source, and electric power starts to be supplied from the PowerBank 100 to the PC 200.

Thereafter, the supply of electric power from the PowerBank 100 to the PC 200 is continued, and finally, when the discharge voltage of the secondary cell in the PowerBank 100 drops to a predetermined value, as shown in FIG. 14B, the PowerBank 100 turns Low Battery, and the supply of electric power from the PowerBank 100 to the PC 200 is stopped.

If the USB cable 2 between the PowerBank 100 and the PC 200 is left connected, the Port Role of the PowerBank 100 changes from Source to Sink and the Port Role of the PC 200 changes from Sink to Source if the DRP function is also implemented in the PC 200. A PD communication is then performed between the PowerBank 100 and the PC 200.

As shown in FIG. 14(C), it is "Unconstrained Power"="False" when the power adapter 202 is not connected to the PC 200. Since the DRP function is implemented in the PC 200, "DRP"="True". The PowerBank 100 determines that the operation continuation condition is not satisfied based on the PDO information during the PD communication, and suspends the power receiving operation. That is, between the PowerBank 100 and the PC 200, the magnitude of the voltage and current to be supplied is not determined, and the power receiving operation is not started.

In such a condition, as shown in FIG. 14D, the user removes the USB cable 2 connecting the PowerBank 100 and the PC 200, and prepares the charger (Charger) 300.

Subsequently, as shown in FIG. 14E, when the PowerBank 100 and the charger 300 are connected by the USB cable 2, PD communication is executed between the PowerBank 100 and the charger 300. Here, the Port Role of the charger 300 is Source fixed, and the Port Role of the PowerBank 100 is fixed from Source to Sink. In the PDO information transmitted from the charger 300, "DRP"="False", and "Unconstrained Power"="True". During the PD communication, the PowerBank 100 determines that the operation continuation condition is satisfied based on the PDO information, and continues the power receiving operation. That is, the magnitude of the voltage and current supplied between the PowerBank 100 and the charger 300 is determined, and power is supplied from the charger 300 to the PowerBank 100.

This sequence of operations allows the PowerBank 100 to be recharged by the charger 300 after the PowerBank 100 supplies the electric power to the PC 200.

As described above, as long as the operation continuation condition is not satisfied, the state transitions are repeated in the order of the Unattached.SNK state (ST4), the Attach-Wait.SNK state (ST5), and the Attached.SNK state (ST6). In order to exit from such a loop of state transition, an explicit action by the user is required. In the case shown in FIG. 14, the explicit action by the user corresponds to detaching the PC 200 connected to the PowerBank 100 and newly connecting the charger 300. By connecting the charger 300 to the PowerBank 100, neither the condition of "DRP"="True" nor the condition of "Unconstrained Power"="False" is satisfied. As a result, the operation continuation condition is satisfied, and the PowerBank 100 continues the power receiving operation and receives power from the charger 300.

Although FIG. 14 illustrates an operation in which the charger 300 is connected to the PowerBank 100 and recharged, recharging may be performed using a PowerBank having a power supply port and a power reception port. For example, a user connects a PowerBank 100 in Low Battery with another PowerBank of charging ports in the hope of charging the PowerBank 100 with another PowerBank.

In this instance, the Port Role for the power supply port of another PowerBank is Sink fixed and the Port Role for the power reception port is Source fixed. Therefore, "DRP"="False" in the PDO information transmitted from another PowerBank. Therefore, when the PowerBank 100 and the power supply port of another PowerBank are connected, the loop exits from the loop of the state transition as described above, and the power receiving operation is executed.

In the fourth embodiment, when the PowerBank 100 in which the DRP function is implemented goes into Low Battery, the sequence in accordance with the standard (USB Type-C and USB PD standards) is continued only if the user has performed explicit actions (e.g., changing the status of the destination).

As shown in FIG. 13, the PowerBank 100 and the PC 200 are kept connected to each other, and the power supply adaptor 202 is connected to the PC 200, so that the power receiving operation can be continued by changing the status to allow the power to return from the PC 200 to the PowerBank 100.

Alternatively, as shown in FIG. 14, in order to recharge the PowerBank 100, the destination may be changed from the PC 200 to the charger 300, and then the power receiving operation may be continued.

In the fourth embodiment, the PowerBank 100 intends to continue supplying electric power to the external device, but it is possible to avoid a situation in which the power is returned from the external device to the PowerBank 100 at any time without the user's involvement.

Fifth Embodiment

In the above-described first embodiment to fourth embodiment, the processor 112 executes the firmware 114 to realize the execution of the processing and the provision of the functions related to the PD controller 110 as described above.

The firmware 114 executed by the processor 112 is a control program and can be installed or updated from the outside. Firmware 114 may, for example, be distributed as stored in a non-transient (non-transitory) recording medium and installed or updated (updated) to a storage area within PD controller 110. As the non-temporary recording medium, an optical recording medium such as an optical disk, a semi-conductor recording medium such as a flash memory, a magnetic recording medium such as a hard disk or a storage tape, or a magneto-optical recording medium such as an MO (Magneto-Optical disk) may be used. That is, the present embodiment may also include a computer-readable control program for realizing the processing and functions as described above, and a recording medium storing the control program.

Alternatively, the firmware 114 may be downloaded from a server device via the Internet or an intranet.

A person skilled in the art will design a PD controller and a device including the PD controller according to the present embodiment by appropriately using a technique according to an age in which the present embodiment is implemented.

Sixth Embodiment

In the above-described first embodiment to fifth embodiment, the processor 112 executes the firmware 114 to realize the execution of the processing and the provision of the functions related to the PD controller 110 as described above. However, some or all of the software may be implemented in hardware instead of such software implementation. For hardware-mounting, hard-wired devices such as ASIC (Application Specific Integrated Circuit) and FPGA (Field-Programmable Gate Array) may be employed.

A person skilled in the art will design a PD controller and a device including the PD controller according to the present embodiment by appropriately using a technique according to an age in which the present embodiment is implemented.

According to the present embodiment, once the power supply from the power supply side to the external devices is started, the electric power stored in the secondary battery on the power supply side is lost and the secondary battery on the power supply side turns Low Battery, and even if the USB cable is kept connected as it is, the roles of the power reception and supply do not change. Therefore, there does not occur an event in which electric power returns from the secondary battery of the external device, which was originally on the power receiving side, to the secondary battery, which was originally on the power supplying side.

As described above, even if the power supply side is turns Low Battery during the power supply from one side to the other between the DRP-compliant device and the DRP-compliant device is left as it is, it is possible to avoid a situation in which the power is returned from the initial power receiving side to the initial power supply side if there is no user involvement.

User involvement includes explicit button operation by the user, connection of the power adapter to the power receiving side, change to the charger on the power receiving side, and the like.

Although the invention made by the present inventor has been specifically described based on the embodiment, the present invention is not limited to the above embodiment, and it is needless to say that various modifications can be made without departing from the gist thereof.

What is claimed is:

1. A controller for providing a port corresponding to DRP (Dual Role Power) which can be both a power supply side and a power reception side in accordance with USB (Universal Serial Bus) Type-C standard and/or USB Power Delivery standard, the controller comprising:
   a control interface for controlling a power management unit for controlling charging and discharging of a secondary battery;
   a signal transmission module for exchanging a signal with a connection destination via a communication line in a USB cable; and
   a sequence execution unit coupled to the control interface and the signal transmission module, and configured to stop substantial execution of a sequence as a power reception side when the discharge voltage of the secondary battery drops to a predetermined value during supplying of electric power stored in the secondary battery as a power supply side to the connection destination unless a predetermined condition is satisfied,
   wherein the sequence execution unit determines that the predetermined condition is satisfied in response to a signal indicating a user's action, and executes the sequence as the power reception side, and
   wherein the signal indicative of the user's action is a signal from a button provided on a housing in which the controller is mounted.

2. The controller according to claim 1, wherein when the electric power stored in the secondary battery is lowered than the predetermined value, the electric power cannot be supplied to the external devices, but the electric power can drive the controller of the own device remains.

3. A controller for providing a port corresponding to DRP (Dual Role Power) which can be both a power supply side and a power reception side in accordance with USB (Universal Serial Bus) Type-C standard and/or USB Power Delivery standard, the controller comprising:
- a control interface for controlling a power management unit for controlling charging and discharging of a secondary battery;
- a signal transmission module for exchanging a signal with a connection destination via a communication line in a USB cable; and
- a sequence execution unit coupled to the control interface and the signal transmission module,
- wherein the sequence execution unit stops substantial execution of a sequence as a power reception side unless a predetermined condition is satisfied when electric power supply from the secondary battery becomes over discharged during supplying of electric power stored in the secondary battery as a power supply side to the connection destination,
- wherein the sequence execution unit determines that the predetermined condition is satisfied in response to a signal indicating a user's action, and executes the sequence as the power reception side, and
- wherein the signal indicative of the user's action is a signal from a button provided on a housing in which the controller is mounted.

4. The controller according to claim 3,
wherein the signal transmission module includes
- a resistor connected between the communication line and a power supply potential and a ground potential, respectively, and
- first and second switches for electrically connecting/disconnecting a path leading to the power supply potential and the ground potential from the communication line, and
- wherein the sequence execution unit gives a control signal to the first and second switches of the signal transmission module to electrically disconnect a path leading to the power supply potential and the ground potential from the communication line when the power supply from the secondary battery becomes over discharged during the supply of the power stored in the secondary battery as a power supply side to the connection destination.

5. The controller according to claim 3, wherein the sequence execution unit is realized by a processor executing a control program.

6. The controller of claim 3,
wherein the sequence as the power reception side includes processing for receiving information about a connection destination, and the predetermined condition includes at least a portion of information about the connection destination.

7. The controller of claim 6, wherein the predetermined condition includes that the connection destination is not a DRP that can be either a power supply side or a power reception side.

8. The controller of claim 6, wherein the predetermined condition includes no constraint on the power to be supplied by a host.

9. A non-transitory recording medium, storing a control program, the control program executed by a processor of a controller for providing ports corresponding to DRPs (Dual Role Power) which can be both a power supply side and a power reception side in accordance with the USB (Universal Serial Bus) Type-C standard and/or USB Power Delivery standard, the controller comprising:
- a control interface for controlling a power management unit for controlling charging and discharging of a secondary battery; and
- a signal transmission module for exchanging a signal with a connection destination via a communication line in a USB cable, the control program causing the processor to execute a step of supplying electric power stored in the secondary battery as a power supply side to the connection destination, and a step of stopping substantial execution of a sequence as a power reception side if a predetermined condition is not satisfied when power supply from the secondary battery becomes over discharged during supply of power to the connection destination,
- wherein the control program causes the processor to execute a step of stopping substantial execution of a sequence as a power reception side unless a predetermined condition is satisfied,
- wherein the control program causes the processor to determine that the predetermined condition is satisfied in response to a signal indicating a user's action, and execute the sequence as the power reception side, and
- wherein the signal indicative of the user's action is a signal from a button provided on a housing in which the controller is mounted.

\* \* \* \* \*